US012548577B2

(12) United States Patent
Reutelhuber et al.

(10) Patent No.: US 12,548,577 B2
(45) Date of Patent: Feb. 10, 2026

(54) APPARATUS, METHOD, OR COMPUTER PROGRAM FOR PROCESSING AN ENCODED AUDIO SCENE USING A PARAMETER CONVERSION

(71) Applicant: Fraunhofer-Gesellschaft zur Förderung der angewandten Forschung e.V., Munich (DE)

(72) Inventors: Franz Reutelhuber, Erlangen (DE); Guillaume Fuchs, Erlangen (DE); Markus Multrus, Erlangen (DE); Eleni Fotopoulou, Erlangen (DE); Stefan Bayer, Erlangen (DE); Jan Büthe, Erlangen (DE); Stefan Döhla, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 326 days.

(21) Appl. No.: 18/194,787

(22) Filed: Apr. 3, 2023

(65) Prior Publication Data

US 2023/0238006 A1 Jul. 27, 2023

Related U.S. Application Data

(63) Continuation of application No. PCT/EP2021/077872, filed on Oct. 8, 2021.

(30) Foreign Application Priority Data

Oct. 9, 2020 (EP) .................................... 20201093
Nov. 13, 2020 (EP) .................................... 20207515
Jun. 22, 2021 (EP) .................................... 21180863

(51) Int. Cl.
*G10L 19/008* (2013.01)
*H04S 7/00* (2006.01)

(52) U.S. Cl.
CPC ............ *G10L 19/008* (2013.01); *H04S 7/303* (2013.01); *H04S 2400/01* (2013.01)

(58) Field of Classification Search
CPC .......... H04S 7/302; H04S 7/307; H04S 3/008; H04S 2400/01; H04S 2400/11; H04S 2420/03
(Continued)

(56) References Cited

U.S. PATENT DOCUMENTS 5,737,484 A 4/1998 Ozawa
6,526,378 B1 2/2003 Tasaki
(Continued)

FOREIGN PATENT DOCUMENTS

AU 2814701 A 6/2001
CN 1281576 A 1/2001
(Continued)

OTHER PUBLICATIONS

Sorami Nakamura, "Notice of Reasons for Rejection for Japanese Application No. 2023-521132", Apr. 7, 2024, JPO, Japan.
(Continued)

*Primary Examiner* — George C Monikang
(74) *Attorney, Agent, or Firm* — Bridgeway IP Law Group, PLLC; Jihun Kim

(57) ABSTRACT

An apparatus for processing an encoded audio scene representing a sound field related to a virtual listener position, the encoded audio scene including information on a transport signal and a first set of parameters related to the virtual listener position includes a parameter converter for converting the first set of parameters into a second set of parameters related to a channel representation including two or more channels for a reproduction at predefined spatial positions for the two or more channels, and an output interface for
(Continued)

generating a processed audio scene using the second set of parameters and the information on the transport signal.

29 Claims, 15 Drawing Sheets

(58) Field of Classification Search
USPC .......................................... 381/17–19, 22–23
See application file for complete search history.

(56) References Cited

U.S. PATENT DOCUMENTS

| | | | |
|---|---|---|---|
| 8,239,209 | B2 | 8/2012 | Oh et al. |
| 10,290,304 | B2 | 5/2019 | Hirvonen et al. |
| 10,354,661 | B2 | 7/2019 | Dick et al. |
| 10,433,076 | B2 | 10/2019 | Jensen et al. |
| 10,475,459 | B2 | 11/2019 | Purnhagen et al. |
| 10,600,425 | B2 | 3/2020 | Boehm et al. |
| 10,706,861 | B2 | 7/2020 | Bayer et al. |
| 11,450,328 | B2 | 9/2022 | Buethe et al. |
| 2006/0195314 | A1 | 8/2006 | Taleb et al. |
| 2006/0277039 | A1 | 12/2006 | Vos et al. |
| 2008/0002842 | A1 | 1/2008 | Neusinger et al. |
| 2008/0120096 | A1 | 5/2008 | Oh et al. |
| 2008/0319765 | A1 | 12/2008 | Oh et al. |
| 2009/0125313 | A1 | 5/2009 | Oliver et al. |
| 2010/0189266 | A1 | 7/2010 | Oh et al. |
| 2011/0013790 | A1 | 1/2011 | Hilpert et al. |
| 2011/0255714 | A1 | 10/2011 | Neusinger et al. |
| 2012/0226506 | A1 | 9/2012 | Ashley et al. |
| 2012/0269353 | A1 | 10/2012 | Herre et al. |
| 2013/0016842 | A1 | 1/2013 | Schultz-Amling et al. |
| 2013/0028426 | A1 | 1/2013 | Purnhagen et al. |
| 2013/0030819 | A1 | 1/2013 | Purnhagen et al. |
| 2015/0066486 | A1 | 3/2015 | Kokkinis et al. |
| 2015/0235646 | A1 | 8/2015 | Miyasaka et al. |
| 2015/0332697 | A1 | 11/2015 | Disch et al. |
| 2015/0380000 | A1 | 12/2015 | Melkote et al. |
| 2016/0055854 | A1 | 2/2016 | Nurmukhanov et al. |
| 2016/0142854 | A1 | 5/2016 | Fueg et al. |
| 2017/0180906 | A1 | 6/2017 | Chebiyyam et al. |
| 2017/0365263 | A1 | 12/2017 | Disch et al. |
| 2018/0315432 | A1 | 11/2018 | Boehm et al. |
| 2019/0259395 | A1 | 8/2019 | Buethe et al. |
| 2019/0259398 | A1 | 8/2019 | Jan et al. |
| 2020/0152209 | A1 | 5/2020 | Büthe et al. |
| 2023/0197086 | A1 * | 6/2023 | Laitinen .................. H04S 7/302 704/500 |
| 2023/0238005 | A1 | 7/2023 | Reutelhuber et al. |

FOREIGN PATENT DOCUMENTS

| | | | |
|---|---|---|---|
| CN | 101124740 | A | 2/2008 |
| CN | 101816040 | A | 8/2010 |
| CN | 101958121 | A | 1/2011 |
| CN | 104781877 | A | 7/2015 |
| CN | 105280190 | A | 1/2016 |
| CN | 105931649 | A | 9/2016 |
| CN | 116438598 | A | 7/2023 |
| CN | 116457878 | A | 7/2023 |
| EP | 3588495 | A1 | 1/2020 |
| GB | 2571949 | A | 9/2019 |
| JP | 2008-511849 | A | 4/2008 |
| JP | 2009-524104 | A | 6/2009 |
| JP | 2010-507114 | A | 3/2010 |
| JP | 2012-512438 | A | 5/2012 |
| JP | 2013-514696 | A | 4/2013 |
| JP | 5576488 | B2 | 8/2014 |
| JP | 5625032 | B2 | 11/2014 |
| JP | 2016-510433 | A | 4/2016 |
| JP | 2016-532149 | A | 10/2016 |
| JP | 2019-504344 | A | 2/2019 |
| JP | 2019-536112 | A | 12/2019 |
| JP | 6677846 | B2 | 4/2020 |
| JP | 2020-528580 | A | 9/2020 |
| RU | 2452043 | C2 | 5/2012 |
| RU | 2711513 | C1 | 1/2020 |
| RU | 2725178 | C1 | 6/2020 |
| TW | I324336 | B | 5/2010 |
| TW | 201636999 | A | 10/2016 |
| WO | 2010/115850 | A1 | 10/2010 |
| WO | 2017/125563 | A1 | 7/2017 |
| WO | 2018/086947 | A1 | 5/2018 |
| WO | 2018/187082 | A1 | 10/2018 |
| WO | 2019/020757 | A2 | 1/2019 |
| WO | 2019175472 | A1 | 9/2019 |
| WO | 2020/115311 | A1 | 6/2020 |
| WO | 2020/152154 | A1 | 7/2020 |

OTHER PUBLICATIONS

P.A. Volkov, "Office Action for Russia Application No. 2023111693", Oct. 24, 2023, Rospatent, Russia.
Sorami Nakamura, "Notice of Reasons for Rejection for Japanese Application No. 2023-521514", Apr. 7, 2024, JPO, Japan.
Shohei Takeshita, "Notice of Reasons for Rejection for Japanese Application No. 2023-520374", Apr. 22, 2024, JPO, Japan.
3GPP TS 26.445, "Codec for Enhanced Voice Services (EVS); Detailed algorithmic description", V17.0.0, May 2022.
V. Pulkki et al., "Directional audio coding-perception—based reproduction of spatial sound", International Workshop on the Principles and Application on Spatial Hearing, 2009.
Venkatraman, Atti et al., "Super-wideband bandwidth extension for speech in the 3GPP EVS codec" , IEEE International Conference on Acoustics, Speech and Signal Processing (ICASSP), Brisbane, 2015.
Herre Jürgen et al., "Interactive Teleconferencing Combining Spatial Audio Object Coding and DirAC Technology", JAES, AES, 60 East 42nd Street, Room 2520 New York 10165-2520, USA, Dec. 1, 2011, vol. 59, No. 12, pp. 924-935, XP040574482 [A].
S. A. Zhuravlev, "Office Action for Russia Application No. 2023111685", Sep. 12, 2023, Rospatent, Russia.
Songmei Luo, "Office Action for Chinese Application No. 202180069361.X", Apr. 23, 2025, CNIPA, China.
O.E. Groshev, "Office Action for Russia Application No. 2023111686", Oct. 18, 2023, Rospatent, Russia.
Hemant Chola, "Office Action for IN Application No. 202317025541", Oct. 28, 2024, Intellectual Property India, India.
Ajay Kumar, "Office Action for IN Application No. 202317025540", Oct. 29, 2024, Intellectual Property India, India.
Park, Taejin et al., "Multichannel Audio Signal Source Separation Based on an Interchannel Loudness Vector Sum", Electronics and Telecommunications Research Institute, Republic of Korea.
Examiner, "Office Action for Chinese Application No. 202180069403.X", Apr. 30, 2025, CNIPA, China.
Cohen, Israel et al., "Adaptive Beamforming and Postfiltering", Springer Handbook of Speech Processing, Springer, 2008, Germany.
Zhou, Ruohua et al., "Music Onset Detection," in Machine Audition: Principles, Algorithms and Systems, IGI Global, 2010, pp. 297-316, doi: 10.4018/978-1-61520-919-4.ch012, USA.
Gauri Shanker, "Office Action for Indian Patent Application No. 202317025543", Oct. 3, 2025, Indian Patent Office, India.

* cited by examiner

APPARATUS, METHOD, OR COMPUTER PROGRAM FOR PROCESSING AN ENCODED AUDIO SCENE USING A PARAMETER CONVERSION

CROSS-REFERENCES TO RELATED APPLICATIONS

This application is a continuation of copending International Application No. PCT/EP2021/077872, filed Oct. 8, 2021, which is incorporated herein by reference in its entirety, and additionally claims priority from European Applications Nos. EP 20 201 093.0, filed Oct. 9, 2020, EP 20 207 515.6, filed Nov. 13, 2020 and EP 21 180 863.9, filed Jun. 22, 2021, all of which are incorporated herein by reference in their entirety.

The present invention relates to audio processing and, particularly, to the processing of an encoded audio scene for the purpose of generating a processed audio scene for rendering, transmission of storing.

BACKGROUND OF THE INVENTION

Traditionally, audio applications that provide the means for user communication like telephony or teleconferencing have been mainly constricted to mono recording and playback. In recent years, however, the advent of new immersive VR/AR technology has also led to rising interest in spatial rendering of communication scenarios. In order to meet this interest a new 3GPP audio standard called Immersive Voice and Audio Services (IVAS) is currently in development. Based on the recently released Enhanced Voice Services (EVS) standard IVAS provides multi-channel and VR extensions capable of rendering immersive audio scenes, for e.g. spatial teleconferencing, while still meeting the low-delay requirements of smooth audio communication. This ongoing need to keep the overall delay of the codec to a minimum without sacrificing playback quality provides the motivation for the work described in the following.

Coding Scene-based Audio (SBA) material—like $3^{rd}$-order Ambisonics content—with a system that uses parametric audio coding—like Directional Audio Coding (DirAC) [1][2]—at low bitrates (e.g. 32 kbps and below) only allows for a single (transport) channel to be coded directly while restoring the spatial information via side parameters at the decoder in a filter-bank domain. In cases where the speaker setup at the decoder is only capable of stereo playback the full restoration of the 3D audio scene is not needed. For higher bitrates coding of 2 transport channels or more is possible, so in those cases a stereophonic reproduction of the scene can be directly extracted and played back without any parametric spatial upmixing (skipping the spatial renderer entirely) and the extra delay that goes along with it (due to an additional filter-bank analysis/synthesis like the Complex-valued Low-Delay Filter-Bank (CLDFB), for example). However, in the low-rate cases with only one transport channel this is not possible. Thus, in the case of DirAC, until now an FOA (First Order Ambisonics) upmix with following L/R conversion was necessary for stereo output. This is problematic because this case is now at a higher overall delay than other possible stereo output configurations in the system and an alignment of all stereo output configuration would be desirable.

Example of DirAC Stereo Rendering with High Delay

FIG. 12 shows an example of a block diagram of a conventional decoder processing for a DirAC stereo upmix with a high delay.

For example, at the encoder, which is not depicted, a single downmix channel is derived via spatial downmixing in the DirAC encoder processing and subsequently coded with a core coder like the Enhanced Voice Services (EVS) [3].

At the decoder, for example, using the conventional DirAC upmix process pictured in FIG. 12, the one available transport channel will first be decoded by using the mono or IVAS mono decoder 1210 from the bitstream 1212, resulting in a time-domain signal that can be seen as a decoded mono downmix 1214 of the original audio scene.

The decoded mono signal 1214 is input to the CLDFB 1220, for analyzing the signal 1214 (converting the signal into the frequency domain) which causes a delay. The significantly delayed output signal 1222 is into to the DirAC renderer 1230. The DirAC renderer 1230 processes the delayed output signal 1222 and a transmitted side information, namely DirAC side parameters 1213, are used to transform the signal 1222 into a FOA representation, namely a FOA upmix 1232 of the original scene with restored spatial information from the DirAC side parameters 1213.

The transmitted parameters 1213 may comprise directional angles, for example one azimuth value for the horizontal plane and one elevation angle for the vertical plane, and one diffuseness value per frequency band to perceptually describe the overall 3D audio scene. Due to the band-wise processing of the DirAC stereo upmix the parameters 1213 are sent multiple times per frame, namely one set for each frequency band. Additionally, each set comprises multiple directional parameters for individual subframes within overall frame (of e.g. 20 ms length) to increase time resolution.

The result of the DirAC renderer 1230 can be, for example, a full 3D scene in FOA format, namely the FOA upmix 1232, which can now be turned, using matrix transformations 1240, into an L/R signal 1242 suitable for playback on a stereo speaker setup. In other words, the L/R signal 1242 can be input to a stereo speaker or can be input to the CLDFB synthesis 1250, which is using predefined channel weights. The CLDFB synthesis 1250 converts the input two output channels (L/R signal 1242) in the frequency domain into the time domain, resulting in an output signal 1252 ready for stereo playback.

Alternatively, it is possible to use the same DirAC stereo upmix to directly generate the rendering for a stereo output configuration, which avoids the intermediate step of generating a FOA signal. This will reduce the algorithmic complexity for a potential complexification of the framework. Nevertheless, both approaches require the use of an additional filter bank after the core coding, which results in an additional delay of 5 ms. A further example of DirAC rendering can be found in [2].

The DirAC stereo upmix approach is rather suboptimal both in terms of delay and in terms of complexity. Due to the use of the CLDFB filter bank the output is significantly delayed (in the DirAC example by an additional 5 ms) and has therefore the same overall delay as the full SBA upmix (compared the delay of a stereo output configuration where the additional step of rendering is not required). It is also a reasonable assumption that doing a full SBA upmix to generate a stereo signal is not ideal regarding system complexity.

SUMMARY

An embodiment may have an apparatus for processing an encoded audio scene representing a sound field related to a virtual listener position, the encoded audio scene comprising information on a transport signal and a first set of parameters related to the virtual listener position, the apparatus comprising: a parameter converter for converting the first set of parameters into a second set of parameters related to a channel representation comprising two or more channels for a reproduction at predefined spatial positions for the two or more channels; and an output interface for generating a processed audio scene using the second set of parameters and the information on the transport signal.

Another embodiment may have a method of processing an encoded audio scene representing a sound field related to a virtual listener position, the encoded audio scene comprising information on a transport signal and a first set of parameters related to the virtual listener position, the method comprising: converting the first set of parameters into a second set of parameters related to a channel representation comprising two or more channels for a reproduction at predefined spatial positions for the two or more channels; and generating a processed audio scene using the second set of parameters and the information on the transport signal.

Another embodiment may have a non-transitory digital storage medium having a computer program stored thereon to perform the method of processing an encoded audio scene representing a sound field related to a virtual listener position, the encoded audio scene comprising information on a transport signal and a first set of parameters related to the virtual listener position, the method comprising: converting the first set of parameters into a second set of parameters related to a channel representation comprising two or more channels for a reproduction at predefined spatial positions for the two or more channels; and generating a processed audio scene using the second set of parameters and the information on the transport signal, when said computer program is run by a computer.

The present invention is based on the finding that, in accordance with a first aspect related to a parameter conversion, an improved concept for processing an encoded audio scene is obtained by converting the given parameters in the encoded audio scene related to a virtual listener position into converted parameters related to a channel representation of a given output format. This procedure provides high flexibility in processing and finally rendering the processed audio scene in a channel-based environment.

An embodiment according to the first aspect of the present invention comprises an apparatus for processing an encoded audio scene representing a sound field related to a virtual listener position, the encoded audio scene comprising information on a transport signal, for example a core encoded audio signal, and a first set of parameters related to the virtual listener position. The apparatus comprises a parameter converter for converting the first set of parameters, for example, Directional Audio Coding (DirAC) side parameters in B-format or First Order Ambisonics (FOA) format, into a second set of parameters, for example, stereo parameters related to a channel representation comprising two or more channels for a reproduction at predefined spatial positions for the two or more channels and an output interface for generating a processed audio scene using the second set of parameters and the information on the transport signal.

In an embodiment a Short-Time Fourier Transform (STFT) filterbank is used for upmixing rather than a Directional Audio Coding (DirAC) renderer. Thus, it becomes possible to upmix one downmix channel (included in the bitstream) into a stereo output without any additional overall delay. By using windows with very short overlaps for the analysis at the decoder, the upmixing allows to stay within an overall delay needed for communications codecs or the upcoming Immersive Voice and Audio Services (IVAS). This value can be, for example, 32 milliseconds. In such embodiments any post processing for the purpose of bandwidth extension can be avoided, because such a processing can be done in parallel with the parameter conversion or parameter mapping.

By mapping the listener-specific parameters for low band (LB) signals, into a set of channel-specific stereo parameters for the low band, a low-delay upmixing for the low band within the DFT domain can be achieved. For the high band, a single set of stereo parameters allows to perform the upmix in the high band in the time domain, advantageously in parallel to the spectral analysis, spectral upmixing and spectral synthesis for the low band.

Exemplarily, the parameter converter is configured to use a single side gain parameter, for panning and a residual prediction parameter that is closely related to the stereo width and also closely related to the diffuseness parameter used in Directional Audio Coding (DirAC).

This “DFT-Stereo” approach allows, in an embodiment, that the IVAS codec stays within the same overall delay as in EVS, particularly 32 milliseconds, in case of processing an encoded audio scene (Scene Based Audio) to obtain a stereo output. By implementing a straightforward processing via the DFT-Stereo instead of spatial DirAC rendering, a lower complexity of parametric stereo upmix is achieved.

The present invention is based on the finding that, in accordance with a second aspect relating to bandwidth extension, an improved concept for processing an encoded audio scene is obtained.

An embodiment according to the second aspect of the present invention comprises an apparatus for processing an audio scene representing a sound field, the audio scene comprising information on a transport signal and a set of parameters. The apparatus further comprises an output interface for generating a processed audio scene using the set of parameters and the information on the transport signal, wherein the output interface is configured to generate a raw representation of two or more channels using the set of parameters and the transport signal, a multichannel enhancer for generating an enhancement representation of the two or more channels using the transport signal and a signal combiner for combining the raw representation of the two or more channels and the enhancement representation of the two or more channels to obtain the processed audio scene.

The generation of the raw representation of the two or more channels on the one hand and the separate generation of the enhancement representation of the two or more channels on the other hand allow great flexibility in selecting algorithms for the raw representation and the enhancement representation. The final combination already takes place for each of the one or more output channels, i.e., in the multichannel output domain rather than in a lower channel input or encoded scene domain. Hence, subsequent to the combining, the two more more channels are synthesized and can be used for further procedures such as rendering, transmission or storage.

In an embodiment a part of the core processing, such as a bandwidth extension (BWE) of the Algebraic Code-Exited Linear Prediction (ACELP) speech coder for the enhancement representation can be performed in parallel to the DFT-Stereo processing for the raw representation. Thus, any delays incurred by both algorithms do not accumulate, but only the given delay incurred by one algorithm will be the final delay. In an embodiment, only the transport signal, for example, the lowband (LB) signal (channel), is input into the output interface, for example, the DFT-Stereo processing, while the highband (HB) is upmixed separately in the time domain, for example by using the multichannel enhancer, so that stereo decoding can be processed within the target time window of 32 milliseconds. By using a broad band panning, for example, based on the mapped side gains, for example, from the parameter converter, a straight time domain upmix for the whole high band is obtained without any significant delay.

In an embodiment, the reduced delay in the DFT-Stereo may not result entirely from the differences in the overlap of the two transformations, for example, the transformation delay of 5 ms caused by the CLDFB and the transformation delay of 3,125 ms caused by the SIFT. Instead, the DFT-Stereo takes advantage of the fact that the last 3.25 ms from the 32 ms EVS coder target delay essentially come from the ACELP BWE. Everything else (the rest of milliseconds until the EVS coder target delay is reached) is simply artificially delayed to achieve alignment of the two transformed signals (HB stereo upmix signal and the HB filling signal with the LB stereo core signal) again at the end. Therefore, in order to avoid additional delay in the DFT-Stereo, only all other components of the encoder are transformed, for example, within a very short DFT window overlap, while the ACELP BWE, for example using the multichannel enhancer, is mixed up almost delay-free in the time domain.

The present invention is based on the finding that, in accordance with a third aspect relating to parameter smoothing, an improved concept for processing an encoded audio scene is obtained by performing a parameter smoothing with respect to time in accordance with a smoothing rule. Thus, the processed audio scene obtained by applying the smoothed parameters rather than the raw parameters to the transport channel(s) will have an improved audio quality. This is particularly true, when the smoothed parameters are upmix parameters, but for any other parameters such as envelope parameters or LPC parameters or noise parameters or scale factor parameters, the usage or the smoothed parameters as obtained by the smoothing rule will result in an improved subjective audio quality of the obtained processed audio scene.

An embodiment according to the third aspect of the present invention comprises an apparatus for processing an audio scene representing a sound field, the audio scene comprising information on a transport signal and a first set of parameters. The apparatus further comprises a parameter processor for processing the first set of parameters to obtain a second set of parameters, wherein the parameter processor is configured to calculate at least one raw parameter for each output time frame using at least one parameter of the first set of parameters for the input time frame, to calculate a smoothing information such as a factor for each raw parameter in accordance with a smoothing rule, and to apply a corresponding smoothing information to the corresponding raw parameter to derive the parameter of the second set of parameters for the output time frame and an output interface for generating a processed audio scene using the second set of parameters and the information on the transport signal.

By smoothing the raw parameters over time, strong fluctuations in the gains or parameters from one frame to the next are avoided. The smoothing factor determines the strength of the smoothing, which is calculated adaptively in embodiments, by the parameter processor that has, in embodiments also the functionality of a parameter converter for converting listener position related parameters into channel related parameters. The adaptive calculation allows to obtain a quicker response whenever the audio scene changes suddenly. The adaptive smoothing factor is calculated bandwise from the change of energies in the current band. The bandwise energies are computed in all subframes included in a frame. In addition, the change of energies over time characterized by two averages, a short-term average and a long-term average, so that extreme cases have no effect on the smoothing, while a less rapid increase in energy does not decrease smoothing so strongly. Thus, the smoothing factor is calculated for each of the DTF-Stereo subframe in the current frame from the quotient of the averages.

It is to be mentioned here that all alternatives or aspects as discussed before and as discussed subsequently can be used individually, i.e., without any aspect. However, in other embodiments, two or more of the aspects are combined with each other and, in other embodiments, all aspects are be combined to each other to obtain an improved compromise between an overall delay, an achievable audio quality, and a required implementation effort.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
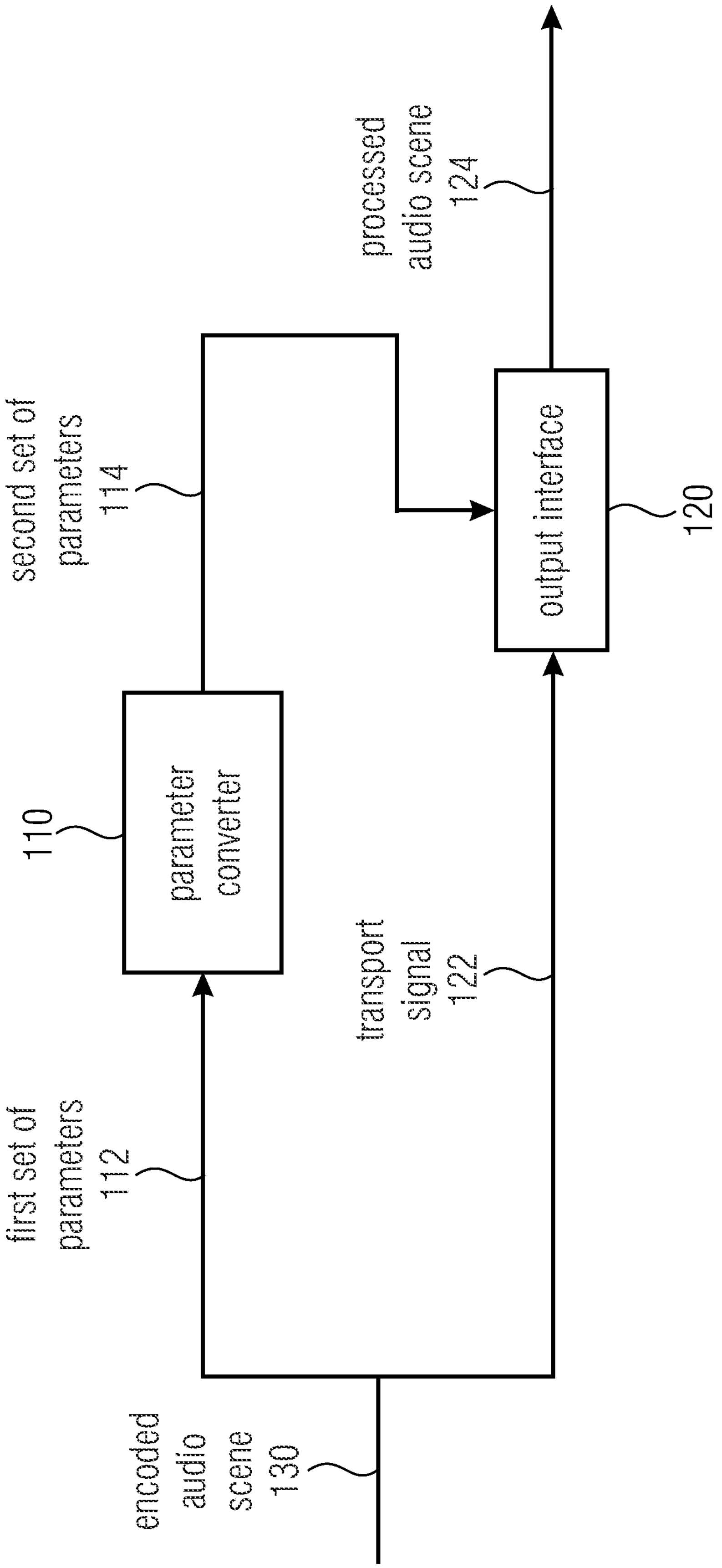
FIG. 1 is a block diagram of an apparatus for processing an encoded audio scene using a parameter converter according to an embodiment.

FIG. 1 illustrates an apparatus for processing an encoded audio scene 130, for example, representing a sound field related to a virtual listener position. The encoded audio scene 130 comprises information on a transport signal 122, for example, a bitstream, and a first set of parameters 112, for example, a plurality of DirAC parameters also included in the bitstream, which are related to the virtual listener position. The first set of parameters 112 are input into a parameter converter 110 or parameter processor which converts the first set of parameters 112 into a second set of parameters 114, which are related to a channel representation comprising at least two or more channels. The apparatus is capable of supporting different audio formats. Audio signals can be acoustic in nature, picked up by microphones, or electrical in nature, which are supposed to be transmitted to the loudspeakers. Supported audio formats can be mono signal, a lowband signal, a highband signal, a multi-channel signal, a first-order and higher-order Ambisonics components, and audio objects. The audio scene can also be described by combining different input formats.

The parameter converter 110 is configured to calculate the second set of parameters 114 as parametric stereo or multichannel parameters, for example, two or more channels, which are input to an output interface 120. The output interface 120 is configured to generate the processed audio scene 124 by combining the transport signal 122 or the information on the transport signal and the second set of parameters 114 to obtain a transcoded audio scene as the processed audio scene 124. Another embodiment comprises upmixing the transport signal 122 using the second set of parameters 114 into an upmix signal, comprising the two or more channels. In other words, the parameter converter 120 maps the first set of parameters 112, for example, used for the DirAC rendering, to the second set of parameters 114. The second set of parameters may comprise a side gain parameter, used for panning, and a residual prediction parameter that, when applied in the upmixing, results in an improved spatial image of the audio scene. For example, the parameters of the first set of parameters 112 may comprise at least one of a direction of arrival parameter, a diffuseness parameter, a direction information parameter related to a sphere with the virtual listening position as an origin of the sphere, and a distance parameter. For example, the parameters of the second set of parameters 114 may comprise least one of a side gain parameter, a residual prediction gain parameter, an inter-channel level difference parameter, an inter-channel time difference parameter, an inter-channel phase difference parameter and an inter-channel coherence parameter.

Figure 2A:
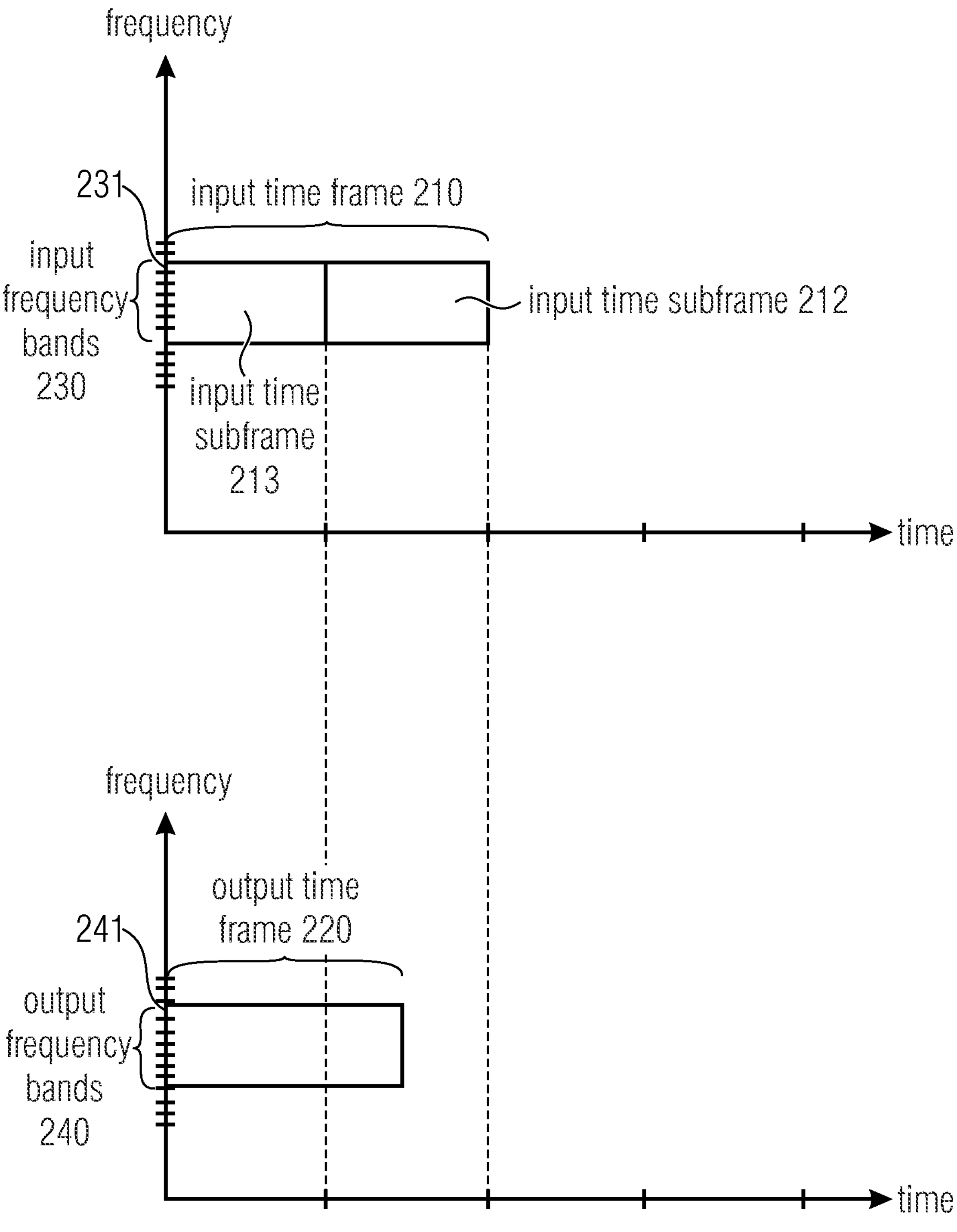
FIG. 2*a* illustrates a schematic diagram for the first set of parameters and for the second set of parameters according to an embodiment.

FIG. 2*a* illustrates a schematic diagram for the first set of parameters 112 and for the second set of parameters 114 according to an embodiment. In particular, a parameter resolution for both parameters (first and second) is pictured. Each abscissa of the FIG. 2*a* represents time and each ordinate of the FIG. 2*a* represents frequency. As shown in FIG. 2*a*, the input timeframe 210, to which the first set of parameters 112 is related, comprises two or more input time subframes 212 and 213. Directly below, an output time frame 220, to which the second set of parameters 114 is related is shown in a corresponding diagram related to the top diagram. This indicates that the output time frame 220 is smaller compared to the input time frame 210 and that the output time frame 220 is longer compared to an input time subframe 212 or 213. It is noted, that an input time subframe 212 or 213 and an output time frame 220 may comprise a plurality of frequencies as a frequency band. The input frequency band 230 may comprise the same frequencies as the output frequency band 240. According to embodiments, the frequency bands of the input frequency band 230 and the output frequency bands 240 may not be connected or correlated to each other.

Figure 4:
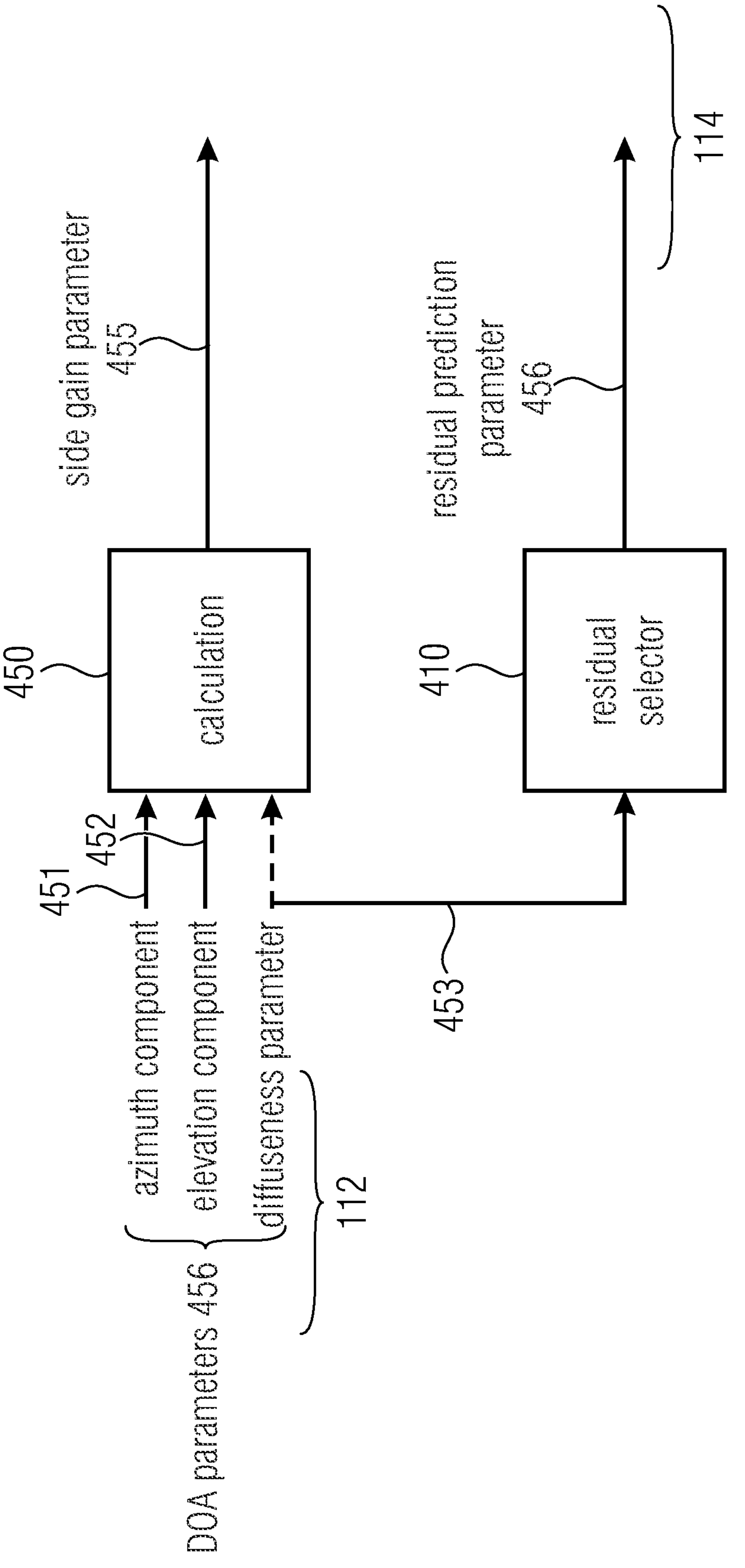
FIG. 4 is an embodiment of a parameter converter for generating side gain parameters and residual prediction parameters.

It is to be noted that a side gain and a residual gain, which are described in FIG. 4, typically are calculated for frames so that, for each input frame 210, a single side gain and a single residual gain is calculated. In other embodiments, however, not only a single side gain and a single residual gain is calculated for each frame, but a group of side gains and a group of residual gains are calculated for an input time frame 210 where each side gain and each residual gain are related to a certain input time subframe 212 or 213, for example, of a frequency band. Thus, in embodiments, the parameter converter 110 calculates, for each frame of the first set of parameters 112 and the second set of parameters 114, a group of side gains and a group of residual gains, where the number of the side and the residual gains for an input time frame 210 is typically equal to the number of input frequency bands 230.

Figure 2B:
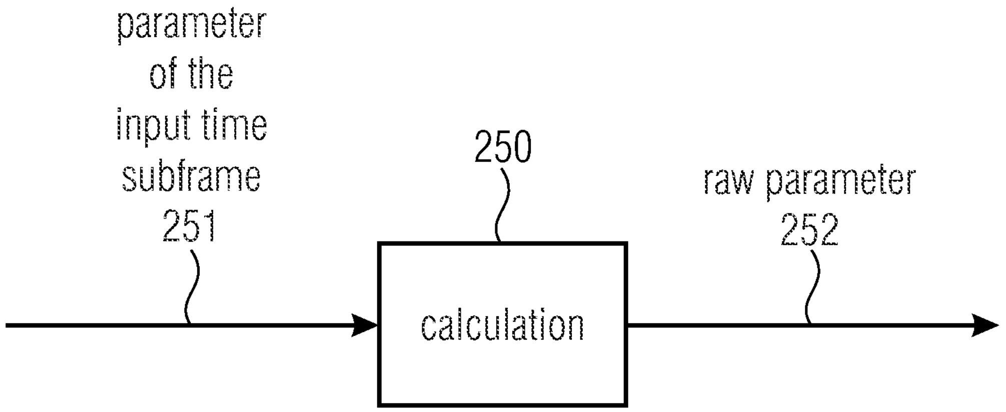
FIG. 2*b* is an embodiment of a parameter converter or parameter processor for calculating a raw parameter.

FIG. 2*b* shows an embodiment of a parameter converter 110 for calculating 250 a raw parameter 252 of the second set of parameters 114. The parameter converter 110 calculates the raw parameter 252 for each one of the two or more input time subframes 212 and 213 in a time-subsequent way. For example, the calculation 250 derives for each input frequency band 230 and time instant (input time subframe 212, 213) a predominant direction-of-arrival (DOA) of azimuth θ and a predominant direction-of-arrival of elevation φ and diffuseness parameter ψ.

For directional components like X, Y and Z, it is given than the first order spherical harmonics at the center position can be derived by the omni-directional component w(b,n) and the DirAC parameters using the following equations:

$$W(b,n)=\sqrt{(1-\psi(b,n))}w(b,n)$$

$$X(b,n)=\sqrt{(1-\psi(k,n))}w(b,n)(\cos(\theta(b,n))\cos(\varphi(b,n)))$$

$$Y(b,n)=\sqrt{(1-\psi(k,n))}w(b,n)(\sin(\theta(b,n))\cos(\varphi(b,n)))$$

$$Z(b,n)=\sqrt{(1-\psi(b,n))}w(b,n)(\sin(\varphi(b,n)))$$

The W channel represents a non-directional mono component of the signal, corresponding to the output of an omnidirectional microphone. The X, Y and Z channels are the directional components in three dimensions. From these four FOA channels it is able to obtain a stereo signal (stereo version, stereo output) by a decoding involving the W channel and the Y channel, using the parameter converter 110, which leads to two cardioids pointing to the azimuth angles +90 degrees and −90 degrees. Due to that fact, the following equation shows the relation of the stereo signal, left and right, in which by adding the Y channel to the W channel the left channel L is represented and in which by subtraction the Y channel from the W channel the right channel R is represented.

$$\begin{cases} L = W + Y \\ R = W - Y \end{cases}$$

In other words, this decoding corresponds to a first order beamforming pointed the two directions, which can be expressed using the following equation:

$$L/R=W+\cos(\theta)\cos(\varphi)X+\sin(\theta)\cos(\varphi)Y+\sin(\varphi)Z$$

Consequently, there is a direct link between stereo output (the left channel and the right channel) and the first set of parameters 112, namely the DirAC parameters.

But, on the other hand the second set of parameters 114, namely the DFT parameters relies on the model of a left L channel and a right R channel based on a mid-signal M and a side signal S, which can be expressed using the following equation:

$$\begin{cases} L = M + S \\ R = M - S \end{cases}$$

Here, M is the transmitted as a mono signal (channel) which corresponds to the omni-directional channel Win case of Scene Based Audio (SBA) mode. Furthermore, in the DFT stereo S is predicted from M using a side gain parameter, which is explained in the following.

FIG. 4 shows an embodiment of the parameter converter 110 for generating the side gain parameters 455 and the residual prediction parameters 456, for example, using a calculation process 450. The parameter converter 110 advantageously processes the calculation 250 and 450 for calculating the raw parameter 252, for example, the side parameter 455 for the output frequency band 241 using the following equation:

$$sidegain[b] = \sin\left(\text{azimuth}[b] * \frac{\pi}{180}\right)\cos\left(\text{elevation}[b] * \frac{\pi}{180}\right)$$

According to the equation, b is the output frequency band, sidegain is the side gain parameter 455, azimuth is an azimuth component of the direction of arrival parameter, and elevation is an elevation component of the direction of arrival parameter. As shown in FIG. 4, the first set of parameters 112 comprises the direction of arrival (DOA) parameters 456, for an input frequency band 231 as described before, and the second set of parameters 114 comprises a side gain parameter 455 per input frequency band 230. However, if the first set of parameters 112 additionally comprises the diffuseness parameter ψ453 for the input frequency band 231, the parameter converter 110 is configured to calculate 250 the side gain parameter 455 for the output frequency band 241 using the following equation:

$$sidegain[b] = \sqrt{1 - diff(b)}\,\sin\left(\text{azimuth}[b] * \frac{\pi}{180}\right)\cos\left(\text{elevation}[b] * \frac{\pi}{180}\right)$$

Figure 2C:
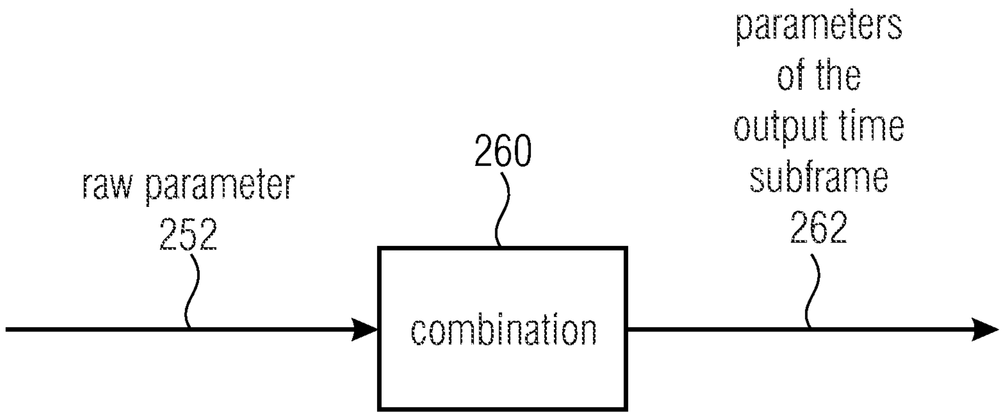
FIG. 2*c* is an embodiment of a parameter converter or parameter processor for combining raw parameters.

According to the equation, diff(b) is the diffuseness parameter ψ453 for the input frequency band b 230. It is to be noted, that the directional parameters 456 of the first set of parameters 112 may comprise different value ranges, for example, the azimuth parameter 451 are [0;360], the elevation parameter 452 are [0;180] and the resulting side gain parameter 455 are [−1;1]. As shown in FIG. 2*c*, the parameter converter 110 combines, using the combiner 260, at least two raw parameters 252, so that a parameter of the second set of parameters 114, related to the output time frame 220, is derived.

According to an embodiment, the second set of parameters 114 further comprises the residual prediction parameter 456 for an output frequency band 241 of the output frequency bands 240, which is shown in FIG. 4. The parameter converter 110 may use, as the residual prediction parameter 456 for the output frequency band 241, the diffuseness parameter ψ453 from the input frequency band 231 as illustrated by the residual selector 410. If the input frequency band 231 and the output frequency band 241 are equal to each other, then the parameter converter 110 uses the diffuseness parameter ψ453 from the input frequency band 231. From the diffuseness parameter ψ453 for the input frequency band 231, a diffuseness parameter ψ453 for the output frequency band 241 is derived, and the diffuseness parameter ψ453 is used for the output frequency band 241 as the residual prediction parameter 456 for the output frequency band 241. Then the parameter converter 110 may use the diffuseness parameter ψ453 from the input frequency band 231.

In the DFT stereo processing, the residual of the prediction, using the residual selector 410, is supposed and expected to be incoherent and is modelled by its energy and decorrelating residual signals going to the Left L and Right R. The residual of the prediction of the side signal S with the mid-signal Mas the mono signal (channel) can be expressed as:

$$R(b) = S(b) - \text{sidegain}[b]M(b)$$

Its energy is modelled in the DFT stereo processing using a residual prediction gain using the following equation:

$$\|R(b)\|^2 = \text{residual prediction}[b]\|M(b)\|^2$$

Since the residual gain represents the inter-channel incoherence component of the stereo signal and the spatial width, it is directly linked to the diffuse part modeled by the DirAC.

Therefore, the residual energy can be rewritten as function of the DirAC diffuseness parameter:

$$\|R(b)\|^2 = \psi(b)\|M(b)\|^2$$

Figure 3:
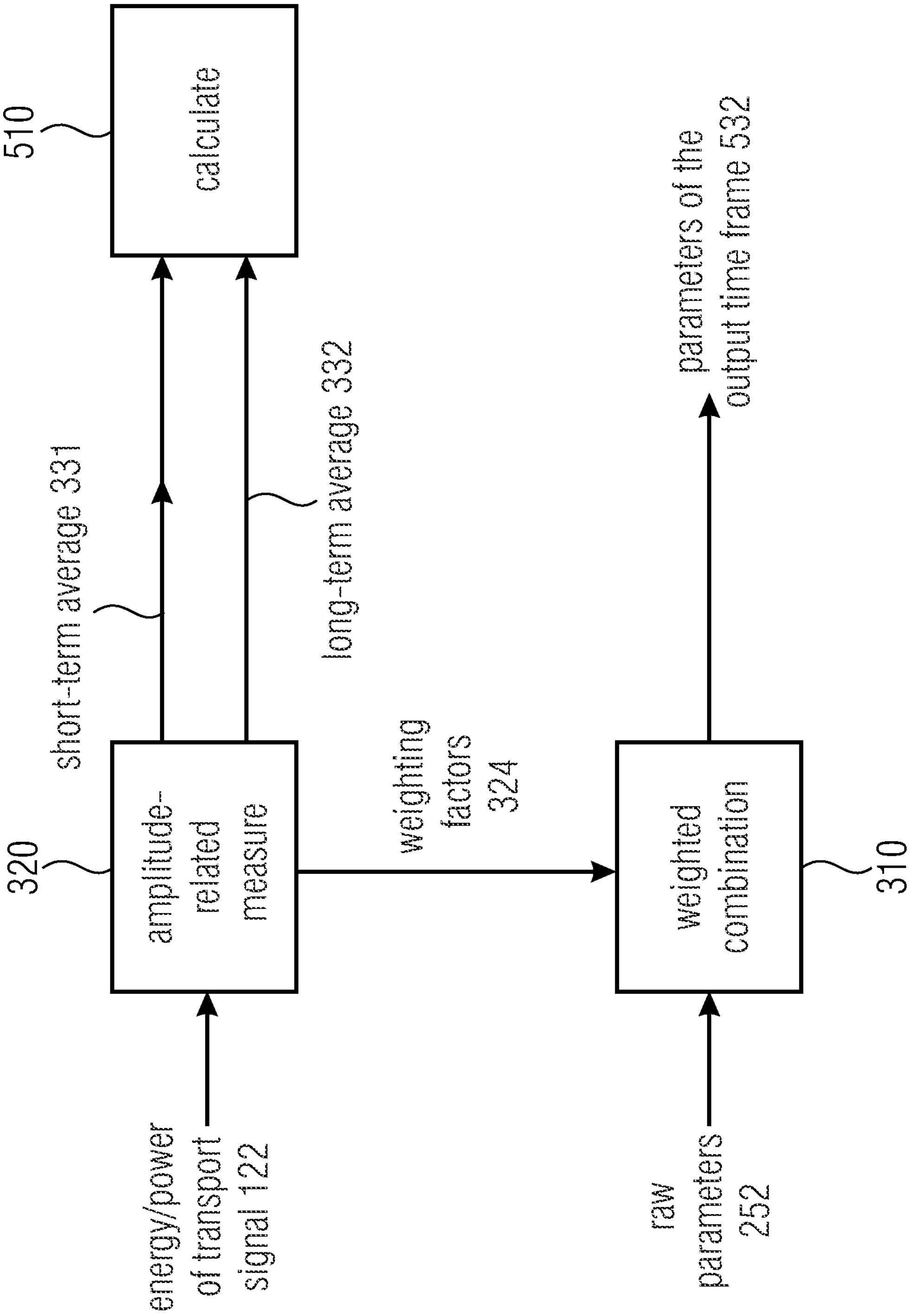
FIG. 3 is an embodiment of a parameter converter or parameter processor for performing a weighted combination of raw parameters.

FIG. 3 shows a parameter converter 110 for performing a weighted combination 310 of raw parameters 252 according to an embodiment. At least two raw parameters 252 are input to the weighted combination 310, wherein weighting factors 324 for the weighted combination 310 are derived based on an amplitude-related measure 320 of the transport signal 122 in the corresponding input time subframe 212. Furthermore, the parameter converter 110 is configured to use, as the amplitude-related measure 320, an energy or a power value of the transport signal 112 in the corresponding input time subframe 212 or 213. The amplitude-related measure 320 measures the energy or power of the transport signal 122 in the corresponding input time subframe 212 for example, so that the weighting factor 324 for that input subframe 212 is greater in case of a higher energy or power of the transport signal 122 in the corresponding input time subframe 212 compared to a weighting factor 324 for an input subframe 212 having a lower energy or power of the transport signal 122 in the corresponding input time subframe 212.

As described before, the directional parameters, azimuth parameters and elevation parameters, have corresponding value ranges. However, the directional parameters of the first set of parameters 112 usually have a higher time resolution than the second set of parameters 114, which means that two or more azimuth and elevation values have to be used for the computation of one side gain value. According to an embodiment, the computation is based on energy-dependent weights, which can be obtained as an output of the amplitude related measure 320. For example, for all K input time subframes 212 and 213 the energy nrg of the subframe is calculated using the following equation:

$$nrg[k] = \sqrt{\sum_{i=0}^{N} x[k][i]^2}, \ k = 0, \ldots, K-1$$

where x is the time domain input signal, N the number of samples in each subframe and i the sample index. Furthermore, for each output time frame l 230 weights 324 can then be computed for the contribution of each input time subframe k 212, 213 inside each output time frame l as:

$$\text{weight}[k] = \frac{nrg[k]}{\sum_{kinl} nrg[k]}$$

The side gain parameters 455 are then ultimately computed using the following equation:

$$\text{side}[l][b] = \sum_{kinl} \text{weight}[k] * \sqrt{1 - diff(b)} \sin\left(azi[k][b] * \frac{\pi}{180}\right) \cos\left(ele[k][b] * \frac{\pi}{180}\right)$$

Due to similarity between the parameters, the diffuseness parameter 453 per band is directly mapped to the residual prediction parameter 456 of all subframes in the same band. The similarity can be expressed with the following equation:

$$\text{residual prediction}[l][b] = \text{diffuseness}[b]$$

Figure 5A:
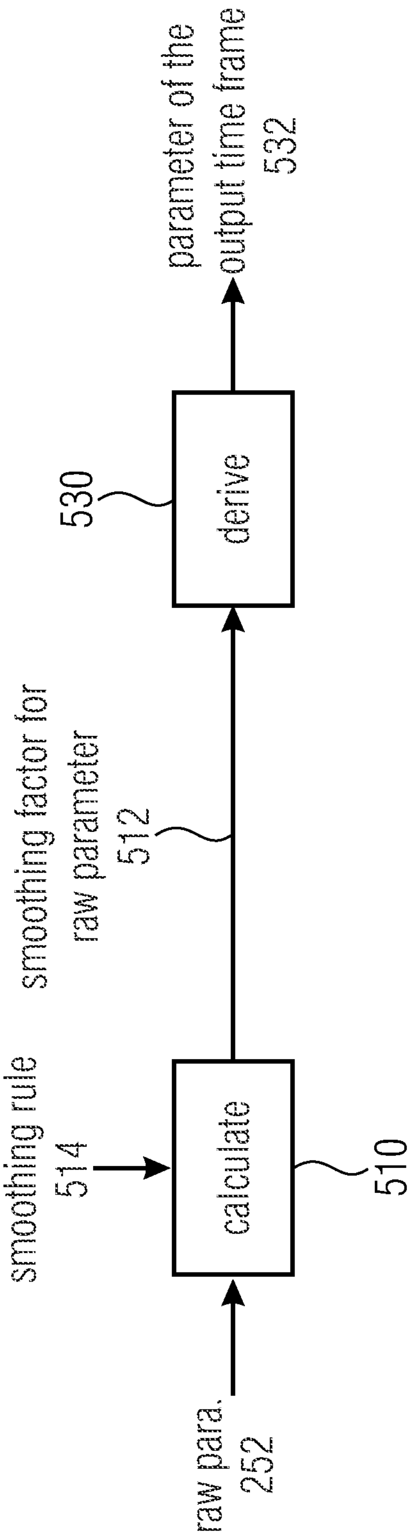
FIG. 5*a* is an embodiment of a parameter converter or parameter processor for calculating a smoothing factor for a raw parameter.

FIG. 5*a* shows an embodiment of a parameter converter 110 or parameter processor for calculating a smoothing factor 512 for each raw parameter 252 in accordance with a smoothing rule 514. Furthermore, the parameter converter 110 is configured to apply the smoothing factor 512 (a corresponding smoothing factor for one raw parameter) to the raw parameter 252 (the one raw parameter corresponding to the smoothing factor) to derive the parameter of the second set of parameters 114 for the output time frame 220, namely the parameter of the output time frame.

Figure 5B:
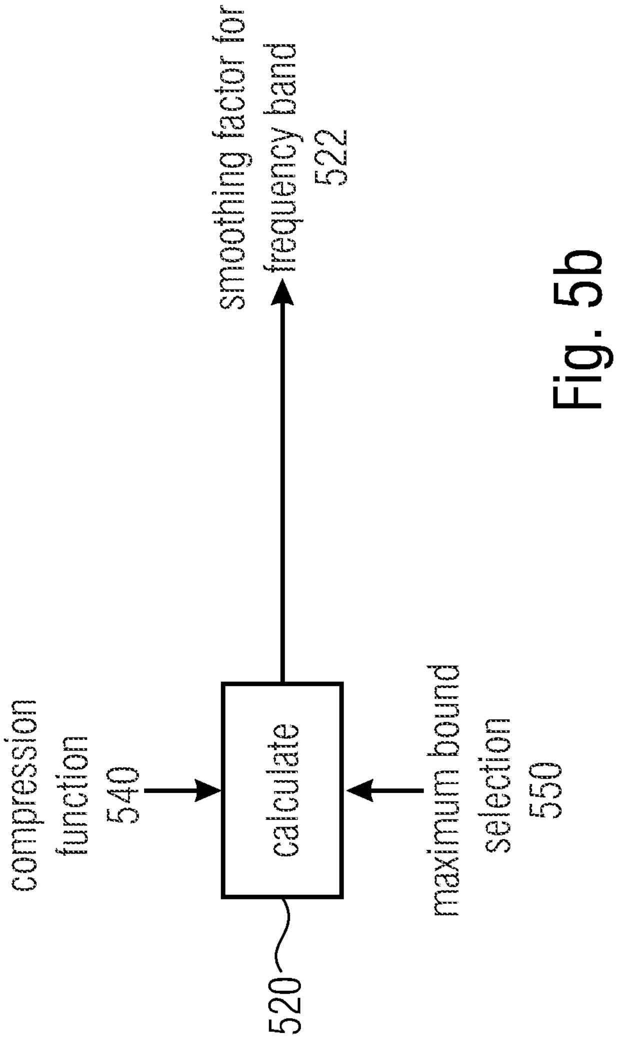
FIG. 5*b* is an embodiment of a parameter converter or parameter processor for calculating a smoothing factor for a frequency band.

FIG. 5*b* shows an embodiment of a parameter converter 110 or parameter processor for calculating a smoothing factor 522 for a frequency band using a compression function 540. The compression function 540 may be different for different frequency bands, so that a compression strength of the compression function 540 is stronger for a lower frequency band than for a higher frequency band. The parameter converter 110 is further configured to calculate the smoothing factor 512, 522 using a maximum bound selection 550. In other words, the parameter converter 110 may obtain the smoothing factor 512, 522 by using different maximum bounds for different frequency bands, so that a maximum bound for a lower frequency band is higher than a maximum bound for a higher frequency band.

Both, the compression function 540 and the maximum bound selection 550 are input to the calculation 520 obtaining the smoothing factor 522 for the frequency band 522. For example, the parameter converter 110 is not limited to use two calculations 510 and 520 for calculating the smoothing factors 512 and 522, so that the parameter converter 110 is configured to calculate the smoothing factors 512, 522 using only one calculation block, which can output the smoothing factors 512 and 522. In other words, the smoothing factor is calculated bandwise (for each raw parameter 252) from the change of energies in the current frequency band. For example, by using the parameter smoothing process, the side gain parameter 455 and the residual prediction parameter 456 are smoothed over time to avoid strong fluctuations in the gains. As this requires a relatively strong smoothing most of the time but requires a quicker response whenever the audio scene 130 changes suddenly, the smoothing factor 512, 522 determining the strength of the smoothing is calculated adaptively.

Therefore, bandwise energies nrg are computed in all subframes k using the following equation:

$$nrg[k][b] = \sqrt{\sum_{iinb} x_{real}[i]^2 + x_{imag}[i]^2}$$

where x are the frequency bins of the DFT-transformed signal (real and imaginary) and i is the bin index over all bins in the current frequency band b.

To capture the change of energies over time two averages, one short-term average 331 and one long-term average 332, are calculated using the amplitude-related measure 320 of the transport signal 122 as shown in FIG. 3.

Figure 6:
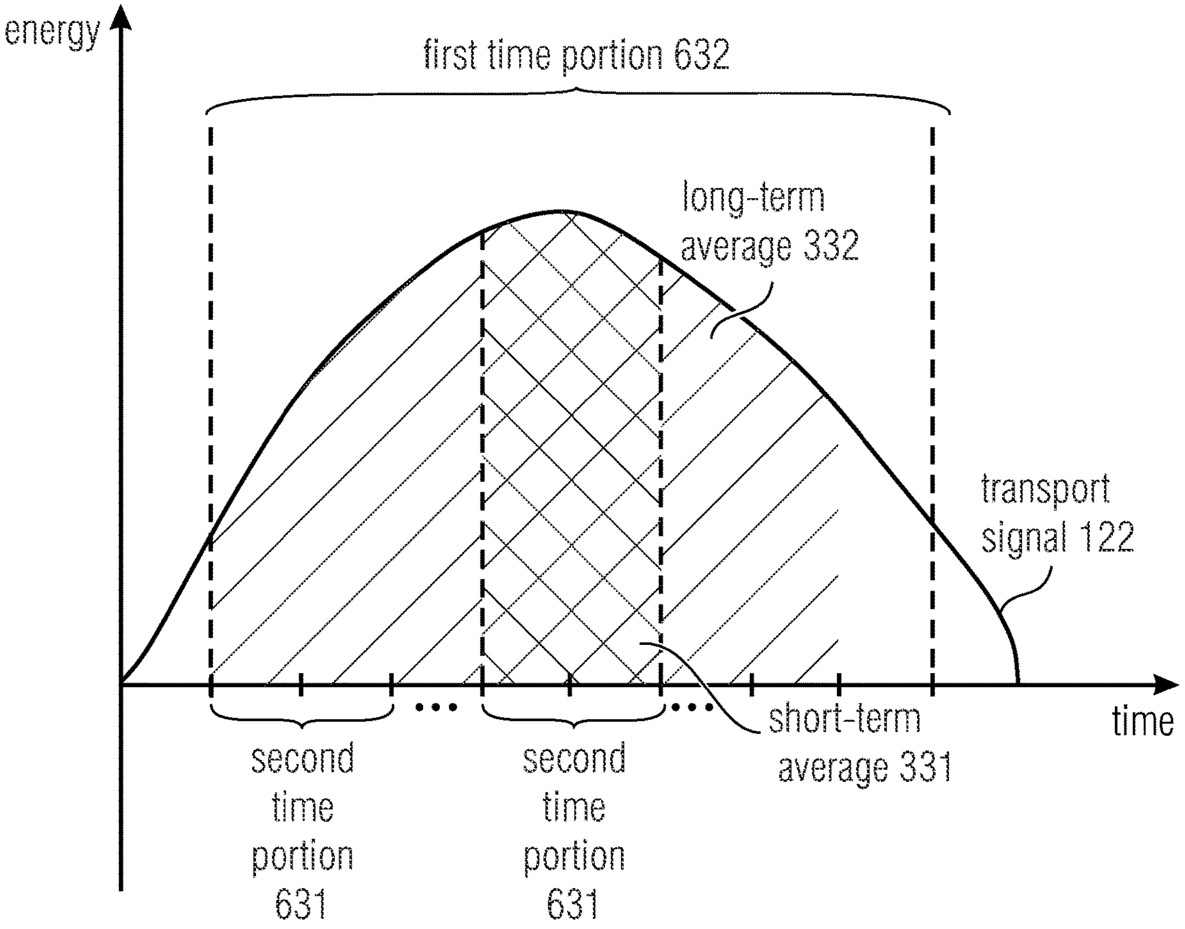
FIG. 6 illustrates a schematic diagram of averaging a transport signal for the smoothing factor according to an embodiment.

FIG. 6 illustrates a schematic diagram of the amplitude-related measure 320 averaging a transport signal 122 for the smoothing factor 512 according to an embodiment. The x-axis represents time and the y-axis represents energy (of the transport signal 122). The transport signal 122 illustrates a schematic part of a sinus function 122. As depictured in FIG. 6 the second time portion 631 is shorter than the first time portion 632. The change of energies over the averages 331 and 332 are calculated for each band b according to the following equation:

$$avg_{short}[b] = \frac{\sum_{k=0}^{N_{short}} nrg[k][b]}{N_{short}}$$

and $$avg_{long}[b] = \frac{\sum_{k=0}^{N_{long}} nrg[k][b]}{N_{long}}$$

Where $N_{short}$ and $N_{long}$ are the number of previous time subframes k over which the individual averages are calculated. For example, in this particular embodiment $N_{short}$ is set to the value of 3 and $N_{long}$ is set to the value of 10.

Furthermore, the parameter converter or parameter processor 110 is configured to calculate, using the calculation 510, the smoothing factor 512, 522 based on a ratio between the long-term average 332 and the short-term average 331. In other words, the quotient of the two averages 331 and 332 is calculated, so that a higher short-term average indicating a recent increase in energy leads to a reduction of smoothing. The following equation shows the correlation of the smoothing factor 512 and the two averages 331 and 312.

$$fac_{smooth}[b] = \max\left(1, \frac{avg_{long}[b]}{avg_{short}[b]}\right)$$

Due to the fact, that higher long-term averages 332 indicating decreasing energy do not lead to a reduced smoothing, the smoothing factor 512 is set to the maximum of 1 (for now). As a result, the above formula limits the minimum of $fac_{smooth}[b]$ to $$\frac{N_{short}}{N_{long}}$$

(in this embodiment 0.3). It is, however, necessary for the factor to be close to 0 in extreme cases which is why the value is transformed from range $$\left[\frac{N_{short}}{N_{long}};1\right]$$

to range [0;1] using the following equation:

$$fac_{smooth}[b] = \left(fac_{smooth}[b] - \frac{N_{short}}{N_{long}}\right)\left(\frac{N_{long}}{N_{long} - N_{short}}\right)$$

In an embodiment, the smoothing is reduced excessively, compared to the smoothing illustrated before, so that the factor is compressed with a root function towards the value of 1. As stability is particularly important in the lowest bands, the 4th root is used in the frequency bands b=0 and b=1. The equation for the lowest bands is:

$$fac_{smooth}[b] = \sqrt[4]{fac_{smooth}[b]}$$

The equation for all other bands b >1 performs a compression by a square root function, using the following equation.

$$fac_{smooth}[b]=\sqrt{fac_{smooth}[b]}$$

By applying a square root function for all other bands b >1, extreme cases, in which the energy may increase exponentially, become smaller, while a less rapid increase in energy does not decrease smoothing that strongly.

Furthermore, the maximum smoothing is set depending on the frequency band for the following equation. It is noted that a factor of 1 would simply repeat the previous value with no contribution of the current gain.

$$fac_{smooth}[b]=\min(fac_{smooth}[b],\text{bounds}[b])$$

Here, bounds[b] represent a given implementation with 5 bands, that are set according to the following table:

| b (= frequency band) | bounds[b] (set value per frequency band) |
|---|---|
| 0 | 0.98 |
| 1 | 0.97 |
| 2 | 0.95 |
| 3 | 0.9 |
| 4 | 0.9 |

The smoothing factor is calculated for each of the DFT Stereo subframe k in the current frame.

Figure 7:
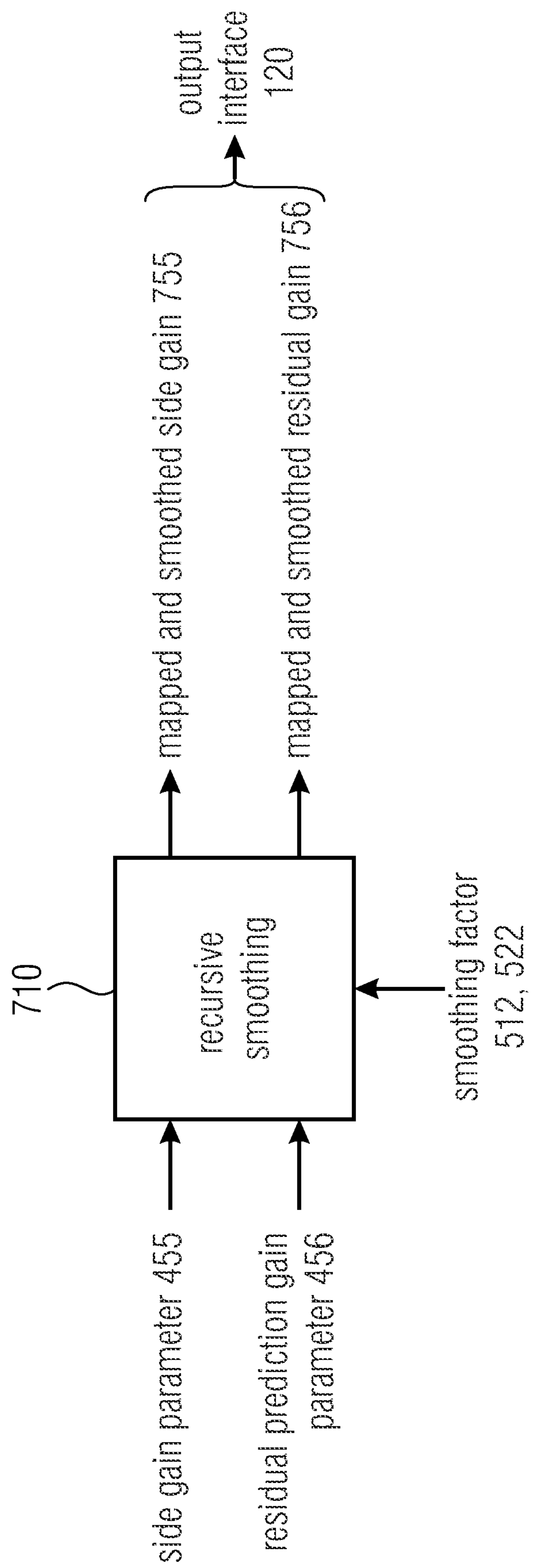
FIG. 7 is an embodiment of a parameter converter parameter processor for calculating a recursive smoothing.

FIG. 7 shows the parameter converter 110 according to an embodiment using a recursive smoothing 710 in which, both the side gain parameter $g_{side}$[k][b] 455 and the residual prediction gain parameter $g_{pred}$[k][b] 456 are recursively smoothed according to the following equations:

$$g_{side}[k][b]=fac_{smooth}[k][b]g_{side}[k-1][b]+(1-fac_{smooth}[k][b])g_{side}[k][b]$$

And $$g_{pred}[k][b]=fac_{smooth}[k][b]g_{pred}[k-1][b]+(1-fac_{smooth}[k][b])g_{pred}[k][b]$$

By combining the parameter for a preceding output time frame 532 weighted by a first weighting value and a raw parameter 252 for the current output time frame 220 weighted by a second weighting value, a recursive smoothing 710 over time-subsequent output time frames for a current output time frame is calculated. In other words, the smoothed parameter for a current output time frame is calculated so that the first weighting value and the second weighting value are derived from the smoothing factor for the current time frame.

These mapped and smoothed parameters ($g_{side}$, $g_{pred}$) are input to the DFT Stereo processing, namely the output interface 120, where the stereo signal (L/R) is generated from a downmix DMX, the residual prediction signal PRED and the mapped parameters $g_{side}$ and a $g_{pred}$. For example, the downmix DMX is obtained from the downmix by either Enhanced Stereo Filling, using allpass-filters or by stereo filling, using a delay. The upmix is described by the following equations:

$$L[k][b][i]=(1+g_{side}[k][b])DMX[k][b][i]+g_{pred}[k][b]g_{norm}\text{PRED}[k][b][i]$$

And $$R[k][b][i]=(1-g_{side}[k][b])DMX[k][b][i]-g_{pred}[k][b]g_{norm}\text{PRED}[k][b][i]$$

The upmix is processed for each subframe k in all bins i in frequency bands b, which is described in the previously shown table. Additionally each side gain $g_{side}$ is weighted by an energy normalization factor $g_{norm}$ computed from the energies of the downmix DMX and the residual prediction gain parameter PRED or $g_{pred}$[k][b] as named above.

The mapped and smoothed side gain 755 and the mapped and smoothed residual gain 756 are input to the output interface 120 for obtaining a smoothed audio scene. Therefore, processing an encoded audio scene using a smoothing parameter, based on the preceding description results in an improved compromise between an achievable audio quality and implementation effort.

Figure 8:
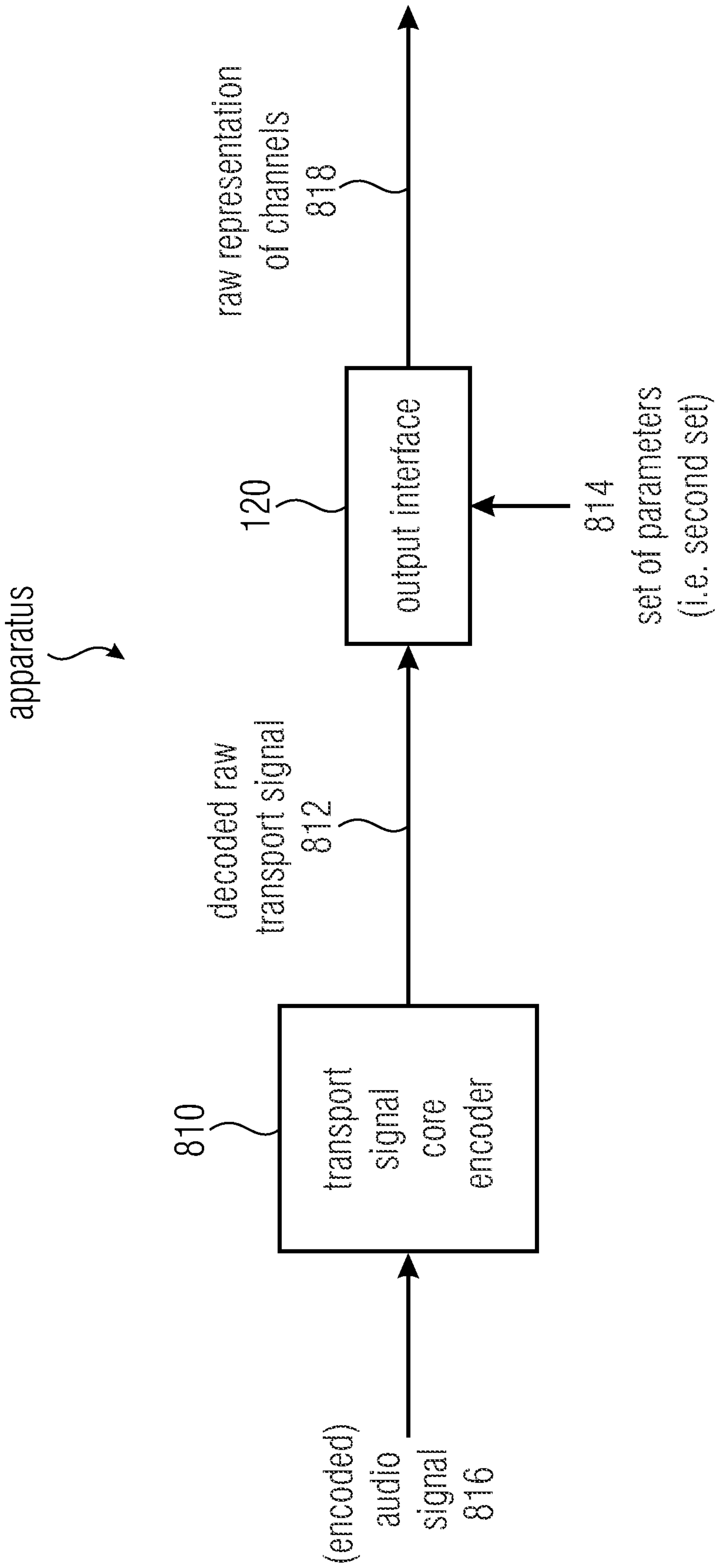
FIG. 8 is an embodiment of an apparatus for decoding a transport signal.

FIG. 8 shows an apparatus for decoding a transport signal 122 according to an embodiment. The (encoded) audio signal 816 is input to the transport signal core decoder 810 for core decoding the (core encoded) audio signal 816 to obtain the (decoded raw) transport signal 812, which is input to the output interface 120. For example, the transport signal 122 may be an encoded transport signal 812, which is output from the transport signal core encoder 810. The transport signal (decoded) 812 is input into the output interface 120, which is configured to generate the raw representation 818 of two or more channels, for example, of the left channel and the right channel, using the set of parameters 814, comprising the second set of parameters 114. For example, the transport signal core decoder 810 for decoding the core encoded audio signal to obtain the transport signal 122, is an ACELP decoder. Furthermore, the core decoder 810 is configured to feed the decoded raw transport signal 812 in two parallel branches, a first branch of the two parallel branches comprising the output interface 120, and a second branch of the two parallel branches comprising the transport signal enhancer 820 or the multichannel enhancer 990 or both. The signal combiner 940 is configured to receive a first input to be combined from the first branch and a second input to be combined from the second branch.

Figure 9:
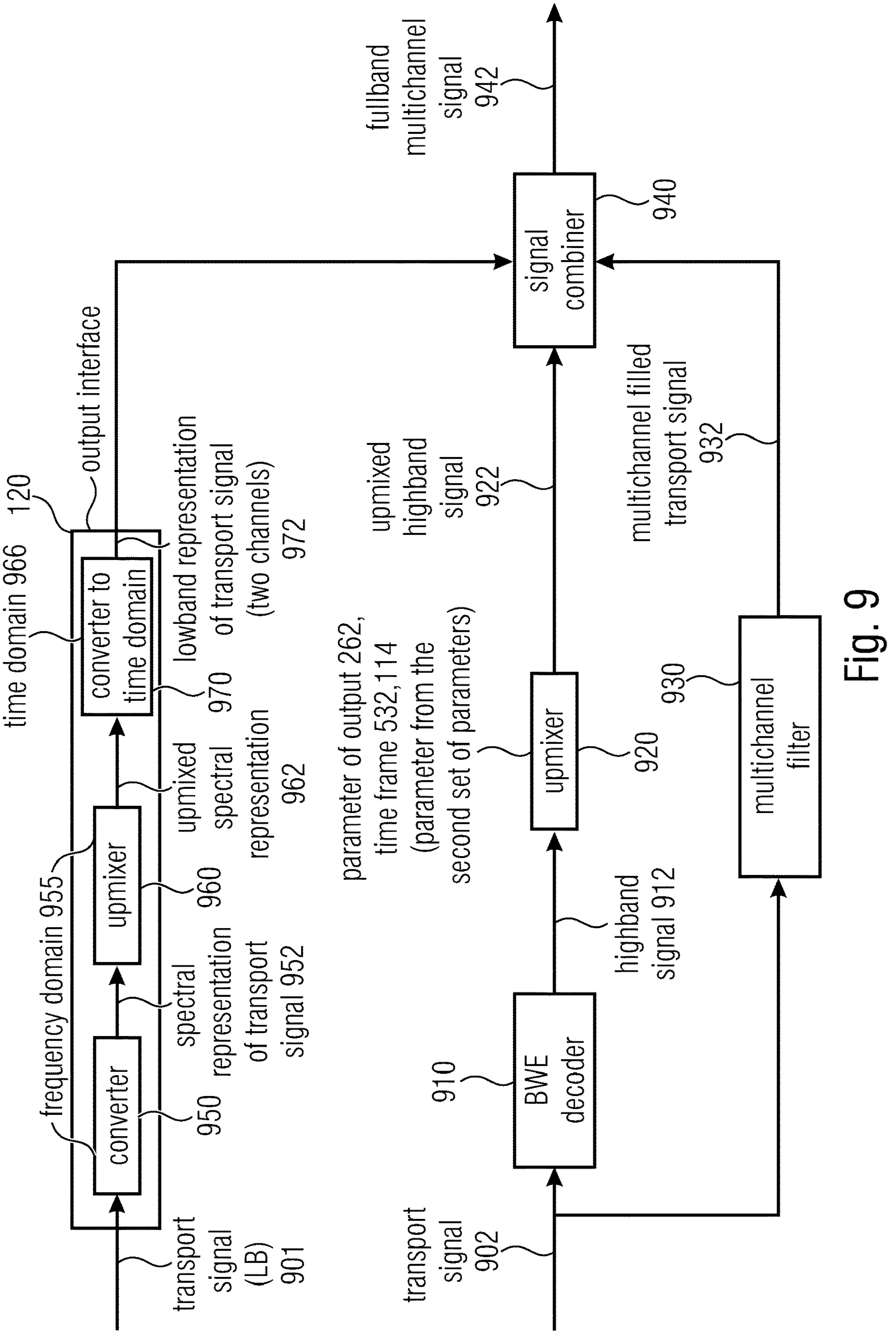
FIG. 9 is an embodiment of an apparatus for processing an encoded audio scene using a bandwidth extension.

As shown in FIG. 9 the apparatus for processing an encoded audio scene 130 may use a bandwidth extension processor 910. The lowband transport signal 901 is input to the output interface 120 for obtaining the two-channel lowband representation of the transport signal 972. It is to be noted that the output interface 120 processes the transport signal 901 in the frequency domain 955, for example, during the upmixing process 960, and converts the two-channel transport signal 901 in the time domain 966. This is done by the converter 970, which converts the upmixed spectral representation 962 that is presenting the frequency domain 955 into the time domain to obtain the two-channel lowband representation of the transport signal 972.

As shown in FIG. 8, the single channel lowband transport signal 901 is input to the converter 950, performing, for example, a conversion of a time portion of the transport signal 901 corresponding to an output time frame 220 into a spectral representation 952 of the transport signal 901, i.e., from the time-domain 966 into the frequency domain 955. For example, as described in FIG. 2 the portion (of the output time frame) is shorter than the input time frame 210, in which the parameters 252 of the first set of parameters 112 are organized.

The spectral representation 952 is input to the upmixer 960 to upmix the spectral representation 952, using, for example, the second set of parameters 114, to obtain the upmixed spectral representation 962, which is (still) processed in the frequency domain 955. As indicated before, the upmixed spectral representation 962 is input into the converter 970 for converting the upmixed spectral representation 962, namely each channel of the two or more channels, from the frequency domain 955 into the time domain 966 (time representation) to obtain the lowband representation 972. Thus, the two or more channels in the upmixed spectral representation 962 are calculated. Advantageously, the output interface 120 is configured to operate in a complex discrete Fourier transform domain, wherein the upmixing operation is performed in the complex discrete Fourier transform domain. The conversion from the complex discrete Fourier transform domain back into the real-valued time domain representation is done using the converter 970. In other words, the output interface 120 is configured to generate a raw representation of the two or more channels using the upmixer 960 in a second domain, namely the frequency domain 955, wherein the first domain represents the time domain 966.

In an embodiment, the upmixing operation of the upmixer 960 is based on the following equation:

$$\tilde{L}_{t,k} = \frac{\left(\tilde{M}_{t,k}\left(1+\tilde{g}_{t,b}\right)+\tilde{r}_{t,b}g_{norm}\tilde{\rho}_{t,k}\right)}{\sqrt{2}}$$

and $$\tilde{R}_{t,k} = \frac{\left(\tilde{M}_{t,k}\left(1-\tilde{g}_{t,b}\right)-\tilde{r}_{t,b}g_{norm}\tilde{\rho}_{t,k}\right)}{\sqrt{2}},$$

wherein $\tilde{M}_{t,k}$ is the transport signal 901 for the frame t and the frequency bin k, wherein $\tilde{g}_{t,b}$ is the side gain parameter 455 for the frame t and the subband b, wherein $\tilde{r}_{t,b}$ is the residual prediction gain parameter 456 for the frame t and the subband b, wherein $g_{norm}$ is an energy adjusting factor that can be there or not, and wherein $\tilde{\rho}_{t,k}$ is a raw residual signal for the frame t and the frequency bin k.

The transport signal 902, 122 is processed in the time domain 966, in contrast to the lowband transport signal 901. The transport signal 902 is input to the bandwidth extension processor (BWE processor) 910 for generating a highband signal 912, and is input to the multichannel filter 930 for applying a multichannel filling operation. The highband signal 912 is input to the upmixer 920 for upmixing the highband signal 912 into an upmixed highband signal 922 using the second set of parameters 144, namely the parameter of the output time frame 262, 532. For example, the upmixer 920 may apply a broad band panning process in the time domain 966 to the high band signal 912 using at least one parameter from the second set of parameters 114.

The lowband representation 972, the upmixed highband signal 922 and the multichannel filled transport signal 932 are input to the signal combiner 940 for combining, in the time domain 966, a result of the broad band panning 922, a result of the stereo filling 932 and the lowband representation of the two or more channels 972. This combining results in a full-band multichannel signal 942 in the time domain 966 as the channel representation. As outlined earlier, the converter 970 converts each channel of the two or more channels in the spectral representation 962 into a time representation to obtain a raw time representation of the two or more channels 972. Hence, the signal combiner 940 combines the raw time representation of the two or more channels and the enhancement time representation of the two or more channels.

In an embodiment, only the lowband (LB) transport signal 901 is input in the output interface 120 (the DFT Stereo) processing while the highband (HB) transport signal 912 is upmixed (using the upmixer 920) separately in the time domain. Such a process is implemented via for a panning operation using the BWE processor 910 plus a time domain stereo filling, using the multichannel filler 930 for generating an ambience contribution. The panning process comprises a broad-band panning that is based on the mapped side gains, for example, a mapped and smoothed side gain 755 per frame. Here, there is only a single gain per frame covering the complete highband frequency region which simplifies the calculation of the left and right highband channels from the downmix channel that is based on the following equations:

$$HB_{left}[k][i]=HB_{dmx}[k][i]+g_{side,hb}[k]*HB_{dmx}[k][i]$$

and $$HB_{right}[k][i]=HB_{dmx}[k][i]-\text{sidegain}_{hb}[k]*HB_{dmx}[k][i]$$

for every sample i in each subframe k.

The highband stereo filling signal $\text{PRED}_{hb}$, namely the multichannel filled transport signal 932 is obtained by delaying the $\text{HB}_{dmx}$ and weighting same by $g_{side,hb}$ and additionally using an energy normalization factor a norm as described in the following equations:

$$\text{PRED}_{hb,left}[i]=g_{pred,hb}*g_{norm}*HB_{dmx}[i-d]$$

and $$\text{PRED}_{hb,right}[i]=-g_{pred,hb}*g_{norm}*HB_{dmx}[i-d]$$

for every sample i in the current time frame (done on a full time frame 210, not on time subframes 213 and 213). d is the number of samples by which the highband downmix is delayed for the generating the filling signal 932 obtained by the multichannel filler 930. Other ways for generating the filling signal apart from delaying can be performed such as a more advanced decorrelation processing or the usage of a noise signal or any other signal derived from the transport signal in a different way compared to a delay.

Both the panned stereo signal 972 and 922 and the generated stereo filling signal 932 are combined (mixed back) to the core signal after the DFT synthesis using the signal combiner 940.

This described process of the ACELP highband is also in contrast to the higher-delay DirAC processing where the ACELP core and the TCX frames are artificially delayed so as to be aligned with the ACELP highband. There, the CLDFB (analysis) is performed on the complete signal, which means, the upmix of the ACELP highband is also done in the CLDFB domain (frequency domain).

Figure 10:
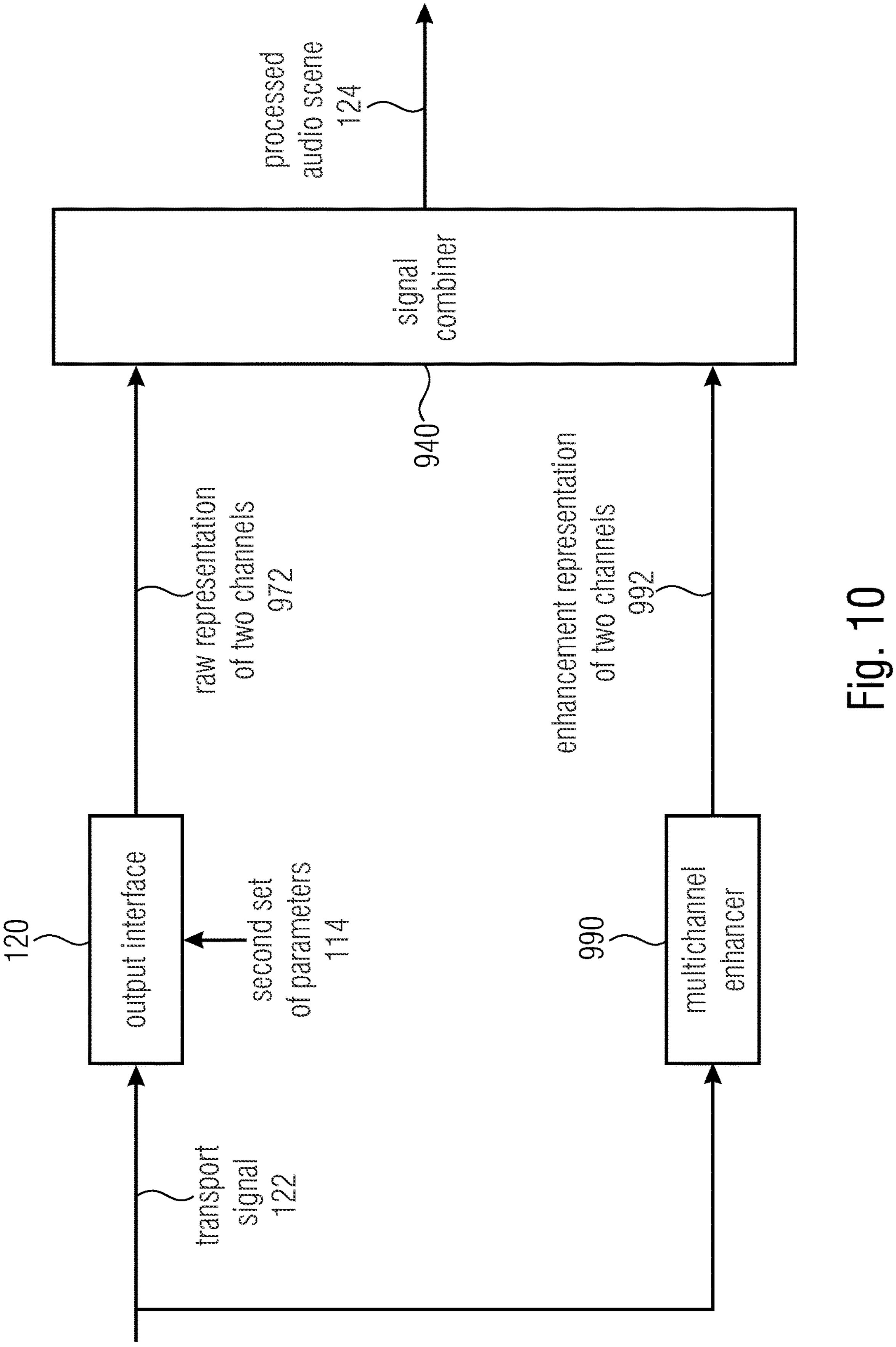
FIG. 10 is an embodiment of an apparatus for obtaining a processed audio scene.

FIG. 10 shows an embodiment of an apparatus for obtaining a processed audio scene 124. The transport signal 122 is input to the output interface 120 for generating the raw representation of two or more channels 972, using the second set of parameters 114 and the multichannel enhancer 990 for generating an enhancement representation 992 of the two or more channels. For example, the multichannel enhancer 990 is configured to perform at least one operation of a group of operations comprising a bandwidth extension operation, a gap filling operation, a quality enhancement operation, or an interpolation operation. Both, the raw representation of the two or more channels 972 and the enhancement representation 992 of the two or more channels are input to the signal combiner 940 to obtain the processed audio scene 124.

Figure 11:
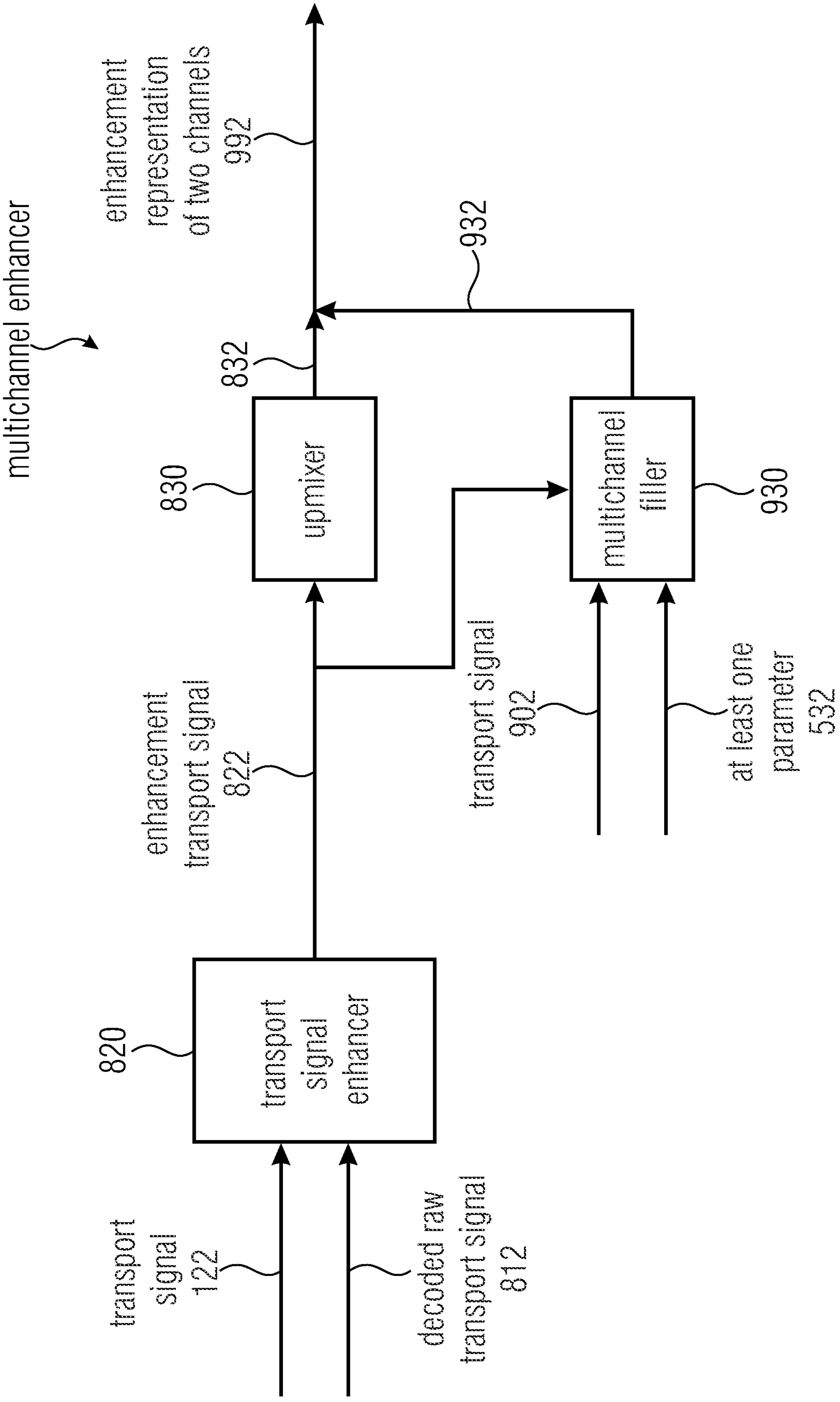
FIG. 11 is a block diagram of an embodiment of a multichannel enhancer.

FIG. 11 shows a block diagram of an embodiment of a multichannel enhancer 990 for generating the enhancement representation 992 of the two or more channels comprising a transport signal enhancer 820, an upmixer 830 and the multichannel filler 930. The transport signal 122 and/or the decoded raw transport signal 812 are/is input the transport signal enhancer 820 generating an enhancement transport signal 822, which is input to the upmixer 830 and the multichannel filler 930. For example, the transport signal enhancer 820 is configured to perform at least one operation of a group of operations comprising a bandwidth extension operation, a gap filling operation, a quality enhancement operation, or an interpolation operation.

As seen in FIG. 9 the multichannel filler 930 generates the multichannel filled transport signal 932 using the transport signal 902 and at least one parameter 532. In other words, the multichannel enhancer 990 is configured for generating an enhancement representation of the two or more channels 992 using the enhancement transport signal 822 and the second set of parameters 114 or using the enhancement transport signal 822 and the upmixed enhancement transport signal 832. For example, multichannel enhancer 990 comprises either the upmixer 830 or a multichannel filler 930 or both the upmixer 830 or the multichannel filler 930 for generating the enhancement representation 992 of the two or more channels using the transport signal 122 or the enhancement transport signal 933 and at least one parameter of the second set of parameters 532. In an embodiment the transport signal enhancer 820 or the multichannel enhancer 990 is configured to operate in parallel with the output interface 120 when generating the raw representation 972 or the parameter converter 110 is configured to operate in parallel with the transport signal enhancer 820.

Figure 12:
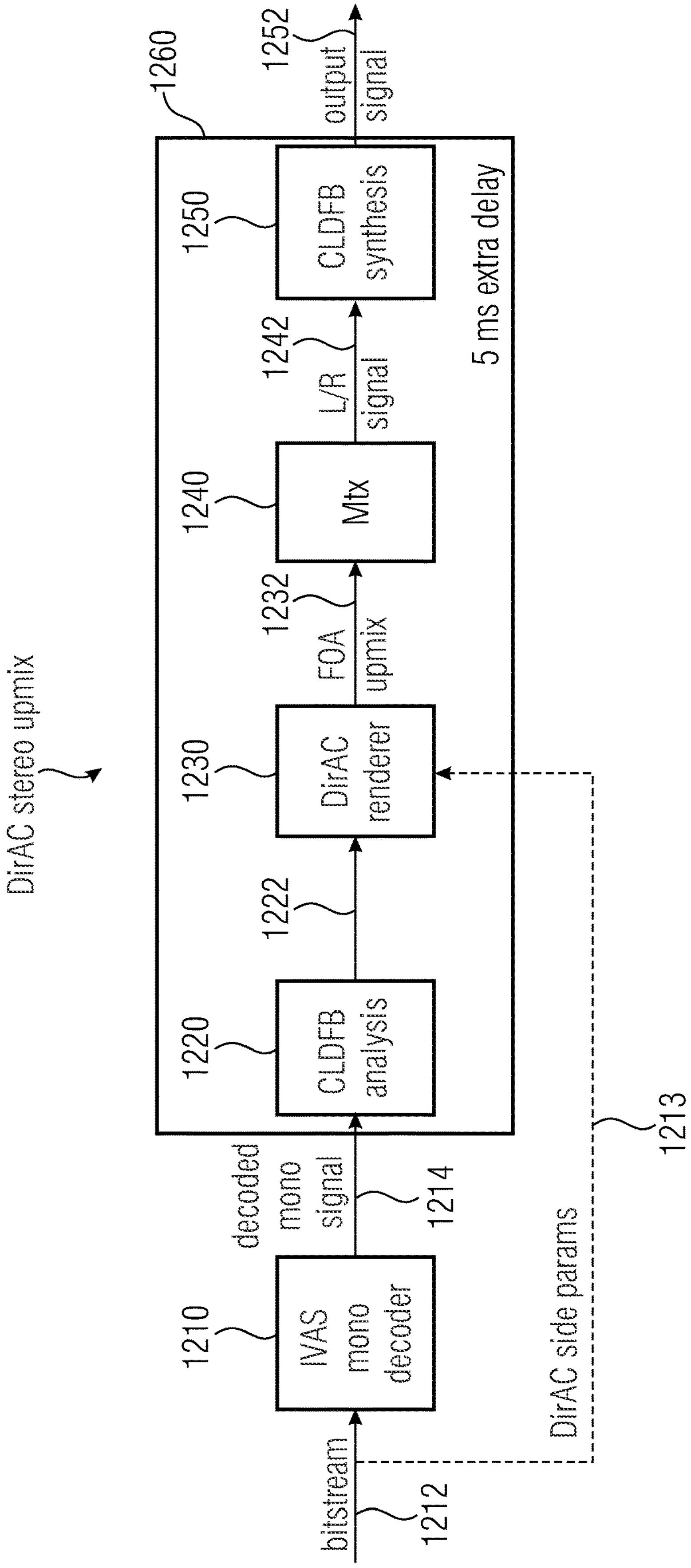
FIG. 12 is a block diagram of a conventional DirAC stereo upmix process.
Figure 13:
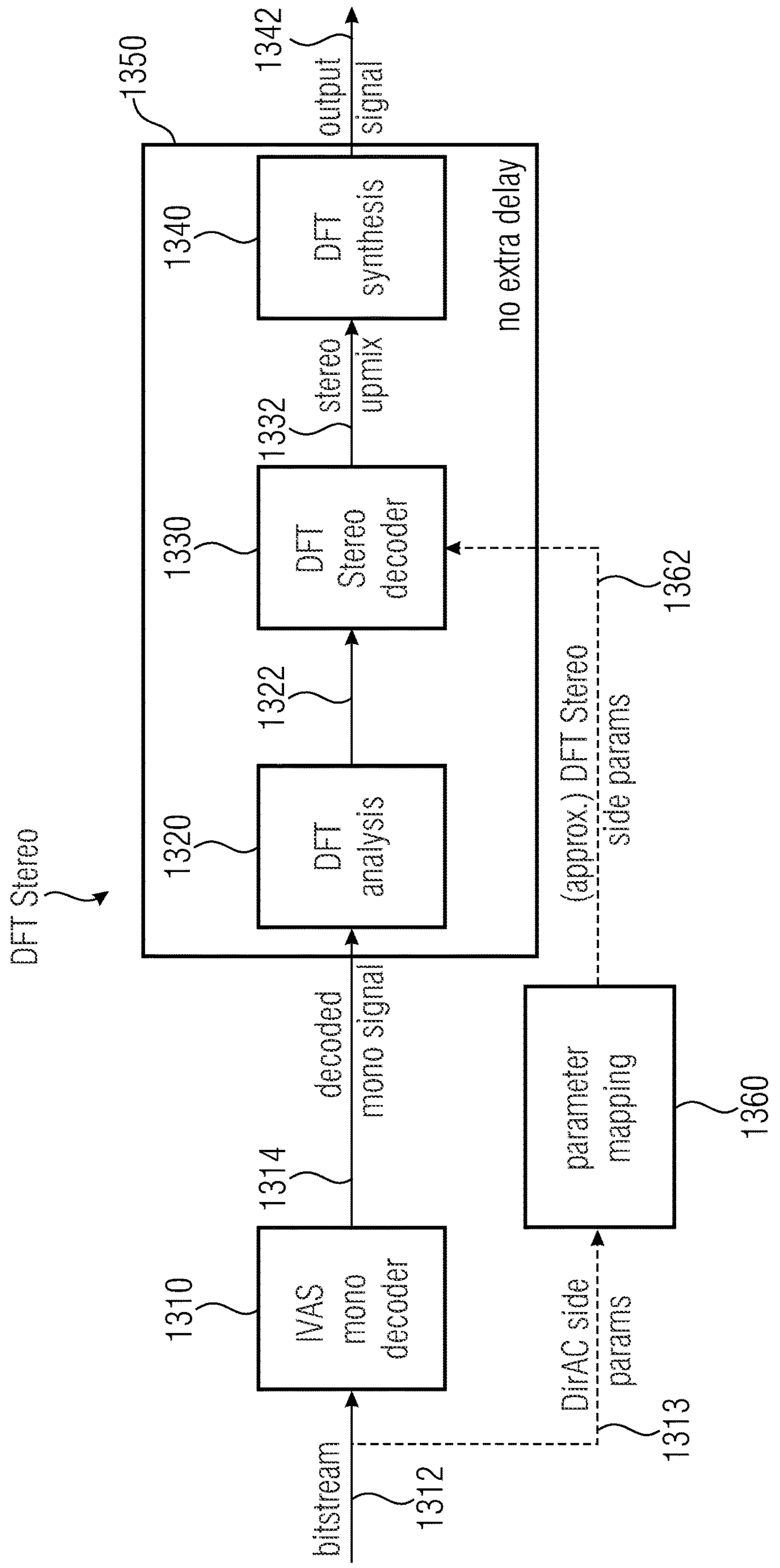
FIG. 13 is an embodiment of an apparatus for obtaining a processed audio scene using a parameter mapping.

I In FIG. 13, the bitstream 1312 that is transmitted from an encoder to a decoder may be the same as in the DirAC-based upmixing scheme shown in the FIG. 12. The single transport channel 1312 derived from a DirAC-based spatial downmixing process is input into the core decoder 1310 and decoded with the core decoder, for example an EVS or IVAS mono decoder, and is transmitted along with the corresponding DirAC side parameters 1313.

In this DFT Stereo approach for processing an audio scene with no extra delay, the initial decoding in the mono core decoder (IVAS mono decoder) of the transport channel also remains unchanged. Instead of going through a CLDFB filterbank 1220 from FIG. 12, the decoded downmix signal 1314 is input to the DFT analysis 1320, for transforming the decoded mono signal 1314 to SIFT domain (frequency domain), such as by using windows with very short overlap. Thus, the DFT analysis 1320 does not cause any additional delay with respect to the targeted system delay of 32 ms only using the remaining headroom between overall delay and what is already caused by the MDCT analysis/synthesis of the core decoder.

The DirAC side parameters 1313 or the first set of parameters 112 are input to the parameter mapping 1360, which for example can comprise the parameter converter 110 or parameter processor for obtaining the DFT Stereo side parameters, namely the second set of parameters 114. The frequency domain signal 1322 and the DFT side parameters 1362 are input to the DFT Stereo decoder 1330 for generating a stereo upmix signal 1332, for example, by using the upmixer 960 described in FIG. 9. The two channels of the stereo upmix 1332 are input to the DFT synthesis, for converting the stereo upmix 1332 from the frequency domain into the time domain, for example, using the converter 970 described in FIG. 9 resulting in the output signal 1342, which may represent the processed audio scene 124.

Figure 14:
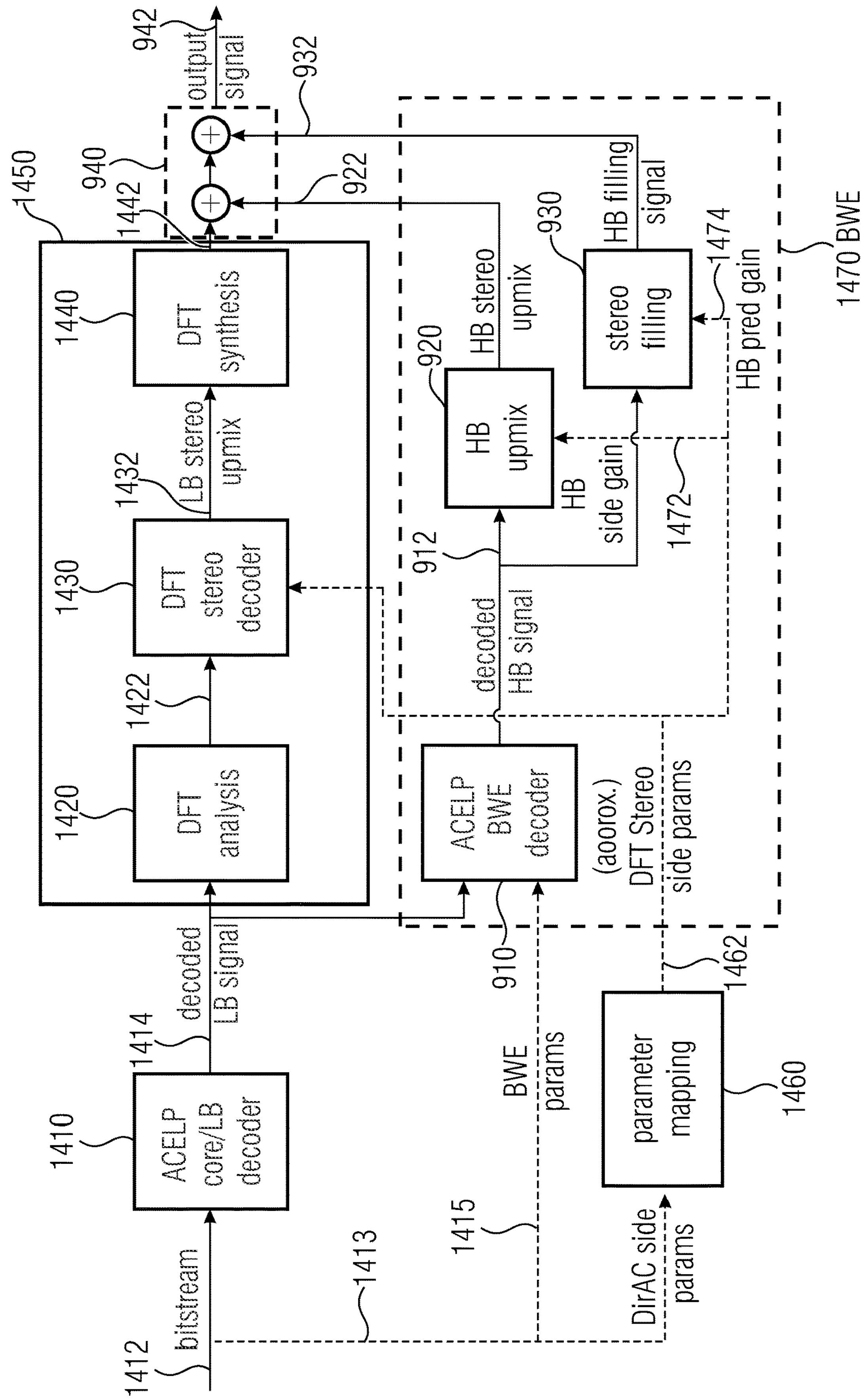
FIG. 14 is an embodiment of an apparatus for obtaining a processed audio scene using a bandwidth extension.

FIG. 14 shows an embodiment for processing an encoded audio scene using a bandwidth extension 1470. The bitstream 1412 is input into an ACELP core or lowband decoder 1410 instead of an IVAS mono decoder as described in FIG. 13 for generating a decoded lowband signal 1414. The decoded lowband signal 1414 is input to the DFT analysis 1420 for converting the signal 1414 into a frequency domain signal 1422, for example, the spectral representation 952 of the transport signal 901 from FIG. 9. The DFT Stereo decoder 1430 may represent the upmixer 960, which generates an LB stereo upmix 1432 using the decoded lowband signal 1442 in frequency domain and the DFT Stereo side parameters 1462 from the parameter mapping 1460. The generated LB stereo upmix 1432 is input to the DFT synthesis block 1440 for performing a conversion into the time domain, using for example, the converter 970 of the FIG. 9. The low band representation 972 of the transport signal 122, namely the output signal 1442 of the DFT synthesis stage 1440 is input to the signal combiner 940 combining the upmixed highband stereo signal 922 and the multichannel filled highband transport signal 932 and the lowband representation of the transport signal 972 resulting in the fullband multichannel signal 942.

The decoded LB signal 1414 and the parameters 1415 for the BWE 1470 are input into the ACELP BWE decoder 910 for generating a decoded highband signal 912. The mapped side gains 1462, for example, the mapped and smoothed side gains 755 for the lowband spectral region are input to the DFT Stereo block 1430, and the mapped and smoothed single side gain for the whole highband are forwarded to the highband upmix block 920 and the stereo filling block 930. The HB upmix block 920 for upmixing the decoded HB signal 912 using the highband side gain 1472, such as the parameters 532 of the output time frame 262 from the second set of parameters 114 generates the upmixed highband signal 922. The Stereo filling block 930 for filling the decoded highband transport signal 912, 902 uses the parameters 532, 456 of the output time frame 262 from the second set of parameters 114 and generates the highband filled transport signal 932.

To conclude, embodiments according to the invention create a concept for processing an encoded audio scene using a parameter conversion, and/or using a bandwidth extension and/or using a parameter smoothing that result in an improved compromise between an overall delay, achievable audio quality, and implementation effort.

Subsequently, further embodiments of the inventive aspects and particularly of a combination of the inventive aspects are illustrated. The proposed solution to achieve a low-delay upmix is by using a parametric stereo approach e.g. the approach described in [4] using Short-Time Fourier Transform (STFT) filterbanks rather than the DirAC renderer. In this "DFT-Stereo" approach an upmix of one downmix channel into a stereo output is described. The advantage of this method is that windows with very short overlaps are used for the DFT analysis at the decoder that allow to stay within much lower overall delay needed for communications codecs like EVS [3] or the upcoming IVAS codec (32 ms). Also, unlike the DirAC CLDFB, the DFT Stereo processing is not a post-processing step to the core coder but runs in parallel with a part of the core processing, namely the bandwidth extension (BWE) of the Algebraic Code-Excited Linear Prediction (ACELP) speech coder without exceeding this already given delay. In relation to the 32 ms delay of EVS the DFT Stereo processing can therefore be called delay-less as it operates at the same overall coder delay. DirAC, on the other hand, can be seen as a post-processor that causes 5 additional ms of delay due to the CLDFB extending the overall delay to 37 ms.

Generally, a gain in delay is achieved. A low-delay is coming from a processing step that happens in parallel with the core processing, whereas an exemplary CLDFB version is a post processing step to do the needed rendering that comes after the core coding.

Unlike DirAC, DFT Stereo makes use of the artificial delay of 3.25 ms for all components except the ACELP BWE by only transforming those components into DFT domain using windows with a very short overlap of 3.125 ms that fit into the available headroom without causing more delay. Thus, only TCX and ACELP without BWE are upmixed in frequency domain, while the ACELP BWE is upmixed in time domain by a separate delay-less processing step called Inter-Channel Bandwidth Extension (ICBWE) [5]. In the special stereo output case of the given embodiment this time-domain BWE processing is slightly altered which will be described towards the end of the embodiment.

The transmitted DirAC parameters cannot be used directly for a DFT Stereo upmix. A mapping of the given DirAC parameters to corresponding DFT Stereo parameters becomes therefore necessary. While DirAC uses azimuth and elevation angles for spatial placement along with a diffuseness parameter, DFT Stereo has a single side gain parameter used for panning and a residual prediction parameter that is closely related to the stereo width and therefore to the diffuseness parameter of DirAC. In terms of parameter resolution each frame is divided in to two subframes and several frequency bands per subframe. Side and residual gain as used in DFT Stereo are described in [6].

DirAC parameters are derived from the band-wise analysis of the audio scene originally in B-format or FOA. It then derives for each band k and time instant n a predominant direction-of-arrival of azimuth θ(b.n) and of elevation φ(b, n) and diffuseness factor ψ(b,n). For directional components it is given than the first order spherical harmonics at the center position can be derived by the omni-directional component w(b,n) and the DirAC parameters:

$$W(b,n)=\sqrt{(1-\psi(b,n))}w(b,n)$$

$$X(b,n)=\sqrt{(1-\psi(k,n))}w(b,n)(\cos(\theta(b,n))\cos(\varphi(b,n)))$$

$$Y(b,n)=\sqrt{(1-\psi(k,n))}w(b,n)(\sin(\theta(b,n))\cos(\varphi(b,n)))$$

$$Z(b,n)=\sqrt{(1-\psi(b,n))}w(b,n)(\sin(\varphi(b,n)))$$

Moreover, from the FOA channels it is possible to get a stereo version by a decoding involving W and Y, which leads to two cardioids pointing to the azimuth angles +90 and −90 degrees.

$$\begin{cases} L = W + Y \\ R = W - Y \end{cases}$$

This decoding correspond to a first order beamforming pointed the two directions.

$$L/R=W+\cos(\theta)\cos(\varphi)X+\sin(\theta)\cos(\varphi)Y+\sin(\varphi)Z$$

Consequently, there is a direct link between stereo output and DirAC parameters. On the other hand DFT parameters relies on the model of a L and R channels based on a mid-signal M and a side signal S.

$$\begin{cases} L = M + S \\ R = M - S \end{cases}$$

M is the transmitted as mono channel and corresponds to the omni-directional channel W in case of SBA mode. In DFT stereo S is predicted from M using a side gain, which can then be expressed using DirAC parameters as follows:

$$\text{sidegain }[b] = \sqrt{(1-\psi(b,n))}\sin\left(\text{azimuth } h[b]*\frac{\pi}{180}\right)\cos\left(\text{elevation }[b]*\frac{\pi}{180}\right)$$

In DFT stereo, the residual of the prediction is supposed and expected to be incoherent and is modelled by its energy and decorrelating residual signals going to the Left and Right. The residual of the prediction of S with M can expressed as:

$$R(b)=S(b)-\text{sidegain}[b]M(b)$$

And its energy is modelled in DFT stereo using a prediction gains as follows:

$$\|R(b)\|^2=\text{respred}[b]\|M(b)\|^2$$

Since the residual gain represents the inter-channel incoherence component of the stereo signal and the spatial width, it is directly linked to the diffuse part modeled by DirAC. Therefore, the residual energy can be rewritten as function of the DirAC diffuseness parameter:

$$\|R(b)\|^2=\psi(b)\|M(b)\|^2$$

As the band configuration normally used DFT Stereo is not the same as for DirAC it has to be adapted to cover the same frequency ranges as the DirAC bands. For those bands the directional angles of DirAC can then be mapped to a side gain parameter of DFT Stereo via $$\text{sidegain}\ [b] = \sqrt{1 - diff(b)}\sin\left(\text{azimuth}\ [b] * \frac{\pi}{180}\right)\cos\left(\text{elevation}\ [b] * \frac{\pi}{180}\right)$$

where b is the current band and parameter ranges are [0; 360] for the azimuth, [0; 180] for the elevation and [−1; 1] for the resulting side gain value. However, the directional parameters of DirAC usually have a higher time resolution than DFT Stereo which means that 2 or more azimuth and elevation values have to be used for the computation of one side gain value. One way would be to do an averaging between the subframes but in this implementation the computation is based on energy-dependent weights. For all K DirAC subframes the energy of the subframe is calculated as $$nrg\ [k] = \sqrt{\sum_{i=0}^{N} x[k][i]^2},$$

$$k = 0, \ldots, K-1$$

where x is the time domain input signal, N the number of samples in each subframe and i the sample index. For each DFT Stereo subframe l weights can then be computed for the contribution of each DirAC subframe k inside l as $$\text{weight}\ [k] = \frac{nrg\ [k]}{\sum_{k\ in\ l} nrg\ [k]}$$

The side gains are then ultimately computed as $$\text{side}\ [l][b] = \sum_{k\ in\ l} \text{weight}\ [k] * \sqrt{1 - diff(b)}\sin\left(azi\ [k][b] * \frac{\pi}{180}\right)\cos\left(ele\ [k][b] * \frac{\pi}{180}\right)$$

Due to similarity between the parameters the one diffuseness value per band is directly mapped to the residual prediction parameter of all subframes in the same band $$\text{respred}[l][b] = \text{diffuseness}[b]$$

Additionally, the parameters are smoothed over time to avoid strong fluctuations in the gains. As this requires a relatively strong smoothing most of the time but requires a quicker response whenever the scene changes suddenly, the smoothing factor determining the strength of the smoothing is calculated adaptively. This adaptive smoothing factor is calculated bandwise from the change of energies in the current band. Therefore, bandwise energies have to be computed in all subframes k first:

$$nrg\ [k][b] = \sqrt{\sum_{i\ in\ b} x_{real}\ [i]^2 + x_{imag}\ [i]^2}$$

where x are the frequency bins of the DFT-transformed signal (real and imaginary) and i is the bin index over all bins in the current band b.

To capture the change of energies over time 2 averages, one short-term and one long-term, are then computed for each band b according to $$avg_{short}\ [b] = \frac{\sum_{k=0}^{N_{short}} nrg\ [k][b]}{N_{short}}$$

and $$avg_{long}\ [b] = \frac{\sum_{k=0}^{N_{long}} nrg\ [k][b]}{N_{long}}$$

Where $N_{short}$ and $N_{long}$ are the number of previous subframes k over which the individual averages are calculated. In this particular implementation $N_{short}$ is set to 3 and $N_{long}$ is set to 10. The smoothing factor is then calculated from the quotient of the averages so that a higher short-term average indicating recent increase in energy leads to a reduction of smoothing:

$$fac_{smooth}\ [b] = \max\left(1, \frac{avg_{long}\ [b]}{avg_{short}\ [b]}\right)$$

Higher long-term averages indicating decreasing energy do not lead to reduced smoothing so the smoothing factor is set to the maximum of 1 for now.

The above formula limits the minimum of $fac_{smooth}[b]$ to $$\frac{N_{short}}{N_{long}}$$

(in this implementation 0.3). It is, however, necessary for the factor to be close to 0 in extreme cases which is why the value is transformed from range $$\left[\frac{N_{short}}{N_{long}}; 1\right]$$

to range [0; 1] via $$fac_{smooth}\ [b] = \left(fac_{smooth}\ [b] - \frac{N_{short}}{N_{long}}\right)\left(\frac{N_{long}}{N_{long} - N_{short}}\right)$$

For less extreme cases, the smoothing is now reduced excessively, so the factor is compressed with a root function towards value 1. As stability is particularly important in the lowest bands, the $4^{th}$ root is used in bands b=0 and b=1:

$$fac_{smooth}\ [b] = \sqrt[4]{fac_{smooth}\ [b]}$$

while all other bands b >1 are compressed by a square root $$fac_{smooth}[b] = \sqrt{fac_{\text{smooth}}[b]}$$

This way extreme cases remain close to 0 while a less rapid increase in energy does not decrease smoothing so strongly.

Finally, the maximum smoothing is set depending on the band (a factor of 1 would simply repeat the previous value with no contribution of the current gain):

$$fac_{smooth}[b]=\min(fac_{smooth}[b],\text{bounds}[b])$$

where bounds[b] in the given implementation with 5 bands are set according to the following table

| b | bounds[b] |
|---|---|
| 0 | 0.98 |
| 1 | 0.97 |
| 2 | 0.95 |
| 3 | 0.9 |
| 4 | 0.9 |

The smoothing factor is calculated for each DFT Stereo subframe k in the current frame.

In the last step, both side gain and residual prediction gain are recursively smoothed according to $$g_{side}[k][b]=fac_{smooth}[k][b]g_{side}[k-1][b]+(1-fac_{smooth}[k][b])g_{side}[k][b]$$

And $$g_{pred}[k][b]=fac_{smooth}[k][b]g_{pred}[k-1][b]+(1-fac_{smooth}[k][b])g_{pred}[k][b]$$

These mapped and smoothed parameters are now fed to the DFT Stereo processing where a stereo signal L/R is generated from the downmix DMX, the residual prediction signal PRED (obtained from the downmix by either "Enhanced Stereo Filling" using allpass-filters [7] or by regular stereo filling using a delay) and the mapped parameters $g_{side}$ and $g_{pred}$. The upmix is described in general by the following formulas [6]:

$$L[k][b][i]=(1+g_{side}[k][b])DMX[k][b][i]+g_{pred}[k][b]g_{norm}\text{PRED}[k][b][i]$$

And $$R[k][b][i]=(1-g_{side}[k][b])DMX[k][b][i]-g_{pred}[k][b]g_{norm}\text{PRED}[k][b][i]$$

for each subframe k all bins i in bands b. Additionally each side gain $g_{side}$ is weighted by an energy normalization factor $g_{norm}$ computed from the energies of DMX and PRED.

Finally, the upmixed signal is transformed back to time domain via IDFT to be played back on the given stereo setup.

As the "time domain bandwidth extension" (TBE) [8] which is used in ACELP generates its own delay (in the implementation this embodiment is based on exactly 2.3125 ms) it cannot be transformed to DFT domain while staying within 32 ms overall delay (where 3.25 ms are left for the stereo decoder of which the STFT already uses 3.125 ms). Thus, only the lowband (LB) is put into the DFT Stereo processing indicated by 1450 in FIG. 14, while the highband (HB) has to be upmixed separately in time domain as shown in block 920 in FIG. 14. In regular DFT Stereo, this is done via Inter-Channel Bandwidth Extension (ICBWE) [5] for panning plus time domain stereo filling for ambience. In the given case the stereo filling in block 930 is computed in the same way as in regular DFT Stereo. The ICBWE processing, however, is skipped entirely due to missing parameters and replaced by a low resources requiring broad-band panning in block 920 based on the mapped side gains 1472. In the given embodiment there is only a single gain covering the complete HB region which simplifies the calculation of the left and right HB channels in block 920 from the downmix channel to $$HB_{left}[k][i]=HB_{dmx}[k][i]+g_{side,hb}[k]*HB_{dmx}[k][i]$$

And $$HB_{right}[k][i]=HB_{dmx}[k][i]-\text{sidegain}_{hb}[k]*HB_{dmx}[k][i]$$

for every sample i in each subframe k.

The HB stereo filling signal $\text{PRED}_{hb}$ is obtained in block 930 by delaying $\text{HB}_{dmx}$ and weighting by $g_{side,hb}$ and an energy normalization factor $g_{norm}$ as $$\text{PRED}_{hb,left}[i]=g_{pred,hb}*g_{norm}*HB_{dmx}[i-d]$$

and $$\text{PRED}_{hb,right}[i]=-g_{pred,hb}*g_{norm}*HB_{dmx}[i-d]$$

for every sample i in the current frame (done on full frame, not on subframes) and where d is the number of samples by which the HB downmix is delayed for the filling signal.

Both the panned stereo signal and the generated stereo filling signal are eventually mixed back to the core signal after the DFT synthesis in combiner 940.

This special treatment of the ACELP HB is also in contrast to the higher-delay DirAC processing where the ACELP core and TCX frames are artificially delayed so as to be aligned with the ACELP HB. There, the CLDFB is performed on the complete signal, i.e. the upmix of the ACELP HB is also done in the CLDFB domain.

Advantages of the Proposed Method

No additional delay allows the IVAS codec to stay within the same overall delay as in EVS (32 ms) for this particular case of SBA input to Stereo output.

Much lower complexity of parametric stereo upmix via DFT than spatial DirAC rendering due to an overall simpler, more straightforward processing.

FURTHER EMBODIMENTS

1. Apparatus, method or computer program for encoding or decoding as described before.

2. Apparatus or method for encoding or decoding or related computer program, comprising:
- system where input is encoded with a model based on the spatial audio representation of a sound scene with a first set of parameters and is decoded at the output with a stereo model for 2 output channels or a multichannel model for more than 2 output channels with a second set of parameters; and/or
- mapping of spatial parameters to stereo parameters; and/or
- conversion from input representation/parameters based on one frequency domain to output representation/parameters based on another frequency domain; and/or
- conversion of parameters with higher time resolution to lower time resolution; and/or
- lower output delay due to shorter window overlap of second frequency transform; and/or
- mapping of DirAC parameters (directional angles, diffuseness) to DFT Stereo parameters (side gain, residual prediction gain) to output SBA DirAC encoded content as stereo; and/or conversion from CLDFB based input representation/parameters to DFT based output representation/parameters; and/or conversion of parameters with 5 ms resolution to parameters with 10 ms; and/or Benefit: lower output delay due to shorter window overlap of DFT compared to CLDFB.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

It is to be outlined that different aspects of the invention relate to a parameter conversion aspect, a smoothing aspect, and a bandwidth expansion aspect. These aspects can be implemented separately or independently from each other, or any two aspects of the at least three aspects can be combined or all three aspects can be combined in an embodiment as described above.

An inventively encoded signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY OR REFERENCES

[1] V. Pulkki, M.-V. V. J. Laitinen, J. Ahonen, T. Lokki and T. Pihlajamäki, "Directional audio coding-perception—based reproduction of spatial sound," in *INTERNATIONAL WORKSHOP ON THE PRINCIPLES AND APPLICATION ON SPATIAL HEARING,* 2009.

[2] G. Fuchs, O. Thiergart, S. Korse, S. Döhla, M. Multrus, F. Küch, Boutheón, A. Eichenseer and S. Bayer, "Apparatus, method and computer program for encoding, decoding, scene processing and other procedures related to dirac based spatial audio coding using low-order, mid-order and high-order components generators". WO Patent 2020115311A1, 11 Jun. 2020.

[3] 3GPP TS 26.445, *Codec for Enhanced Voice Services* (*EVS*); *Detailed algorithmic description.*

[4] S. Bayer, M. Dietz, S. Döhla, E. Fotopoulou, G. Fuchs, W. Jaegers, G. Markovic, M. Multrus, E. Ravelli and M. Schnell, "APPARATUS AND METHOD FOR ESTIMATING AN INTER-CHANNEL TIME DIFFERENCE". Patent WO17125563, 27 Jul. 2017.

[5] V. S. C. S. Chebiyyam and V. Atti, "Inter-channel bandwidth extension". WO Patent 2018187082A1, 11 Oct. 2018.

[6] J. Büthe, G. Fuchs, W. Jägers, F. Reutelhuber, J. Herre, E. Fotopoulou, M. Multrus and S. Korse, "Apparatus and method for encoding or decoding a multichannel signal using a side gain and a residual gain". WO Patent WO2018086947A1, 17 May 2018.

[7] J. Büthe, F. Reutelhuber, S. Disch, G. Fuchs, M. Multrus and R. Geiger, "Apparatus for Encoding or Decoding an Encoded Multichannel Signal Using a Filling Signal Generated by a Broad Band Filter". WO Patent WO2019020757A2, 31 Jan. 2019.
[8] V. A. e. al., "Super-wideband bandwidth extension for speech in the 3GPP EVS codec," in *IEEE International Conference on Acoustics, Speech and Signal Processing* (*ICASSP*), Brisbane, 2015.

The invention claimed is:

1. Apparatus for processing an encoded audio scene representing a sound field related to a virtual listener position, the encoded audio scene comprising information on a transport signal and a first set of parameters related to the virtual listener position, the apparatus comprising:

a parameter converter for converting the first set of parameters into a second set of parameters related to a channel representation comprising two or more channels for a reproduction at predefined spatial positions for the two or more channels; and an output interface for generating a processed audio scene using the second set of parameters and the information on the transport signal, wherein an input time frame, to which the first set of parameters is related, comprises two or more input time subframes, and wherein an output time frame, to which the second set of parameters is related, is smaller than the input time frame and longer than an input time subframe of the two or more input time subframes, and wherein the parameter converter is configured to calculate a raw parameter of the second set of parameters for each one of the two or more input time subframes being time-subsequent and to combine at least two raw parameters to derive a parameter of the second set of parameters related to the output time frame, or wherein the parameter converter is configured to calculate at least one raw parameter for each output time frame using at least one parameter of the first set of parameters for the input time frame, to calculate a smoothing factor for each raw parameter in accordance with a smoothing rule, and to apply a corresponding smoothing factor to a corresponding raw parameter to derive the parameter of the second set of parameters for the output time frame, or wherein the first set of parameters comprises a diffuseness parameter for an input frequency band, and wherein the second set of parameters comprises a residual prediction gain parameter for an output frequency band, and wherein the parameter converter is configured to use, as the residual prediction gain parameter for the output frequency band, the diffuseness parameter from the input frequency band, when the input frequency band and the output frequency band are equal to each other, or to derive, from the diffuseness parameter for the input frequency band, a diffuseness parameter for the output frequency band, and to use the diffuseness parameter for the output frequency band as the residual prediction gain parameter for the output frequency band, or wherein the output interface is configured to perform a conversion of a time portion of the transport signal corresponding to an output time frame into a spectral representation, to perform an upmixing operation of the spectral representation using the second set of parameters to acquire the two or more channels in the spectral representation; and to convert each channel of the two or more channels in the spectral representation into a time representation to acquire a raw time representation of the two or more channels, and wherein a signal combiner is configured for combining the raw time representation of the two or more channels and an enhancement representation of the two or more channels.

2. Apparatus of claim 1, wherein the output interface is configured for upmixing the transport signal using the second set of parameters into an upmix signal comprising the two or more channels.

3. Apparatus of claim 1, wherein the output interface is configured to generate the processed audio scene by combining the transport signal or the information on the transport signal and the second set of parameters to acquire a transcoded audio scene as the processed audio scene.

4. Apparatus of claim 1, wherein the first set of parameters comprises, for each input time frame of a plurality of input time frames and for each input frequency band of a plurality of input frequency bands, at least one directional audio coding (DirAC) parameter, wherein the parameter converter is configured to calculate the second set of parameters as parametric stereo or multichannel parameters.

5. Apparatus of claim 4, wherein the at least one DirAC parameter comprises at least one of a direction of arrival parameter, a diffuseness parameter, a direction information parameter related to a sphere with a virtual listening position as an origin of the sphere, and a distance parameter, and wherein the parametric stereo or multichannel parameters comprise at least one of a side gain parameter, a residual prediction gain parameter, an inter-channel level difference parameter, an inter-channel time difference parameter, an inter-channel phase difference parameter and an inter-channel coherence parameter.

6. Apparatus of claim 1, wherein the parameter converter is configured to perform, in the combine the at least two raw parameters, a weighted combination of the at least two raw parameters, wherein weighting factors for the weighted combination are derived based on an amplitude-related measure of the transport signal in a corresponding input time subframe.

7. Apparatus of claim 6, wherein the amplitude-related measure is an energy or a power of the transport signal in the corresponding input time subframe, and wherein a weighting factor for an input time subframe is greater in case of a higher energy or higher power of the transport signal in the corresponding input time subframe compared to a weighting factor for an input time subframe comprising a lower energy or lower power of the transport signal in the corresponding input time subframe.

8. Apparatus of claim 1, wherein the parameter converter is configured to calculate a long-term average over an amplitude-related measure of a first time portion of the transport signal, and to calculate a short-term average over an amplitude-related measure of a second time portion of the transport signal, wherein the second time portion is shorter than the first time portion, and to calculate a smoothing factor based on a ratio between the long-term average and the short-term average.

9. Apparatus of claim 1, wherein the parameter converter is configured to calculate a smoothing factor for a band using a compression function, the compression function being different for different frequency bands, and wherein a compression strength of the compression function is stronger for a lower frequency band than for a higher frequency band.

10. Apparatus of claim 1, wherein the parameter converter is configured to calculate the smoothing factor using different maximum bounds for different bands, wherein a maximum bound for a lower band is higher than a maximum bound for a higher band.

11. Apparatus of claim 1, wherein the parameter converter is configured to apply, as the smoothing rule, a recursive smoothing rule over time-subsequent output time frames, so that a smoothed parameter for a current output time frame is calculated by combining the parameter for a preceding output time frame weighted by a first weighting value and a raw parameter for the current output time frame weighted by a second weighting value, wherein the first weighting value and the second weighting value are derived from the smoothing factor for the current output time frame.

12. Apparatus for processing an encoded audio scene representing a sound field related to a virtual listener position, the encoded audio scene comprising information on a transport signal and a first set of parameters related to the virtual listener position, the apparatus comprising:

a parameter converter for converting the first set of parameters into a second set of parameters related to a channel representation comprising two or more channels for a reproduction at predefined spatial positions for the two or more channels; and an output interface for generating a processed audio scene using the second set of parameters and the information on the transport signal, wherein the output interface is configured to perform a conversion of a time portion of the transport signal corresponding to an output time frame into a spectral representation, wherein the time portion of the transport signal is shorter than an input time frame, in which the first set of parameters are organized, to perform an upmixing operation of the spectral representation using the second set of parameters to acquire the two or more channels in the spectral representation; and to convert each channel of the two or more channels in the spectral representation into a time representation.

13. Apparatus of claim 12, wherein the output interface is configured to convert into a complex discrete Fourier transform domain, to perform the upmixing operation in the complex discrete Fourier transform domain, and to perform the conversion from the complex discrete Fourier transform domain into a real-valued time domain representation.

14. Apparatus of claim 12, wherein the output interface is configured to perform the upmixing operation based on the following equation:

$$\tilde{L}_{t,k} = \frac{\left(\tilde{M}_{t,k}\left(1 + \tilde{g}_{t,b}\right) + \tilde{r}_{t,b} g_{norm} \tilde{\rho}_{t,k}\right)}{\sqrt{2}}$$

and $$\tilde{R}_{t,k} = \frac{\left(\tilde{M}_{t,k}\left(1 - \tilde{g}_{t,b}\right) - \tilde{r}_{t,b} g_{norm} \tilde{\rho}_{t,k}\right)}{\sqrt{2}},$$

wherein $\tilde{M}_{t,k}$ is the transport signal for a frame t and a frequency bin k, wherein $\tilde{L}_{t,k}$ is a first channel of the two or more channels in the spectral representation for the frame t and the frequency bin k, wherein $\tilde{R}_{t,k}$ is a second channel of the two or more channels in the spectral representation for the frame t and the frequency bin k, wherein $\tilde{g}_{t,b}$ is a side gain parameter for the frame t and a subband b, wherein $\tilde{r}_{t,b}$ is a residual prediction gain parameter for the frame t and the subband b, wherein $g_{norm}$ is an energy adjusting factor that can be there or not, and wherein $\tilde{\rho}_{t,k}$ is a raw residual signal for the frame t and the frequency bin k.

15. Apparatus of claim 14, wherein the information on the transport signal comprises a core encoded audio signal, and wherein the apparatus further comprises:

a core decoder for core decoding the core encoded audio signal to acquire the transport signal.

16. Apparatus of claim 15, wherein the core decoder is in an ACELP decoder, or wherein the output interface is configured to convert the transport signal being a low band signal into a spectral representation, to upmix the spectral representation and to convert an upmixed spectral representation in a time domain to acquire a low band representation of the two or more channels, wherein the apparatus comprises a bandwidth extension processor for generating a high band signal from the transport signal in the time domain, wherein the apparatus comprises a multichannel filler to apply a multichannel filling operation to the transport signal in the time domain, wherein the apparatus comprises an upmixer to apply a broad band panning in the time domain to the high band signal using at least one parameter from the second set of parameters, and wherein the apparatus comprises a signal combiner for combining, in the time domain, a result of the broad band panning, a result of the multichannel filling operation, and the low band representation of the two or more channels to acquire a full band multichannel signal in the time domain as the channel representation.

17. Apparatus for processing an encoded audio scene representing a sound field related to a virtual listener position, the encoded audio scene comprising information on a transport signal and a first set of parameters related to the virtual listener position, the apparatus comprising:

a parameter converter for converting the first set of parameters into a second set of parameters related to a channel representation comprising two or more channels for a reproduction at predefined spatial positions for the two or more channels; and an output interface for generating a processed audio scene using the second set of parameters and the information on the transport signal, wherein the first set of parameters comprises a direction of arrival parameter for an input frequency band, and wherein the second set of parameters comprises a side gain parameter per input frequency band, and wherein the parameter converter is configured to calculate the side gain parameter for an output frequency band using the following equation:

$$\text{sidegain } [b] = \sin\left(\text{azimuth } [b] * \frac{\pi}{180}\right)\cos\left(\text{elevation } [b] * \frac{\pi}{180}\right),$$

wherein b is the output frequency band, wherein sidegain is the side gain parameter, wherein azimuth is an azimuth component of the direction of arrival parameter, and wherein elevation is an elevation component of the direction of arrival parameter.

18. Apparatus of claim 17, wherein the first set of parameters additionally comprises a diffuseness parameter for the input frequency band, and wherein the parameter converter is configured to calculate the side gain parameter for the output frequency band using the following equation $$\text{sidegain }[b]=\sqrt{1-diff(b)}\sin\left(\text{azimuth }[b]*\frac{\pi}{180}\right)\cos\left(\text{elevation }[b]*\frac{\pi}{180}\right)$$

wherein diff(b) is the diffuseness parameter for the input frequency band b.

19. Apparatus for processing an encoded audio scene representing a sound field related to a virtual listener position, the encoded audio scene comprising information on a transport signal and a first set of parameters related to the virtual listener position, the apparatus comprising:

a parameter converter for converting the first set of parameters into a second set of parameters related to a channel representation comprising two or more channels for a reproduction at predefined spatial positions for the two or more channels; and an output interface for generating a processed audio scene using the second set of parameters and the information on the transport signal, wherein the output interface is configured to generate a raw representation of the two or more channels using the second set of parameters and the transport signal, wherein the apparatus further comprises a multichannel enhancer for generating an enhancement representation of the two or more channels using the transport signal, and a signal combiner for combining the raw representation of the two or more channels and the enhancement representation of the two or more channels to acquire the processed audio scene.

20. Apparatus of claim 19, wherein the multichannel enhancer is configured for generating an enhancement representation of the two or more channels using an enhancement transport signal and the second set of parameters, or wherein the multichannel enhancer comprises a transport signal enhancer for generating an enhancement transport signal, and an upmixer for upmixing the enhancement transport signal.

21. Apparatus of claim 20, wherein the transport signal is an encoded transport signal, and wherein the apparatus further comprises:

a core decoder for generating a decoded raw transport signal, wherein the transport signal enhancer is configured for generating the enhancement transport signal using the decoded raw transport signal, and wherein the output interface is configured to generate the raw representation of the two or more channels using the second set of parameters and the decoded raw transport signal.

22. Apparatus of claim 20, wherein the multichannel enhancer comprises either the upmixer or a multichannel filler or both the upmixer or the multichannel filler for generating the enhancement representation of the two or more channels using the transport signal or the enhancement transport signal and at least one parameter of the second set of parameters.

23. Apparatus of claim 20, wherein the output interface is configured to generate a raw representation of the two or more channels using an upmix in a second domain, wherein the transport signal enhancer is configured for generating the enhancement transport signal in a first domain being different from the second domain, or wherein the multichannel enhancer is configured for generating the enhancement representation of the two or more channels using the enhancement transport signal in the first domain, and wherein the signal combiner is configured to combine the raw representation of the two or more channels and the enhancement representation of the two or more channels in the first domain.

24. Apparatus of claim 23, wherein the first domain is a time domain and the second domain is a spectral domain.

25. Apparatus of claim 20, wherein the transport signal enhancer or the multichannel enhancer is configured to perform at least one operation of a group of operations comprising a bandwidth extension operation, a gap filling operation, a quality enhancement operation, or an interpolation operation.

26. Apparatus of claim 20, wherein the transport signal enhancer or the multichannel enhancer is configured to operate in parallel with the output interface when generating the raw representation, or wherein the parameter converter is configured to operate in parallel with the transport signal enhancer.

27. Apparatus of claim 21, wherein the core decoder is configured to feed the decoded raw transport signal in two parallel branches, a first branch of the two parallel branches comprising the output interface, and a second branch of the two parallel branches comprising the transport signal enhancer or the multichannel enhancer or both, and wherein the signal combiner is configured to receive a first input to be combined from the first branch and a second input to be combined from the second branch.

28. Method of processing an encoded audio scene representing a sound field related to a virtual listener position, the encoded audio scene comprising information on a transport signal and a first set of parameters related to the virtual listener position, the method comprising:

converting the first set of parameters into a second set of parameters related to a channel representation comprising two or more channels for a reproduction at predefined spatial positions for the two or more channels; and generating a processed audio scene using the second set of parameters and the information on the transport signal, wherein an input time frame, to which the first set of parameters is related, comprises two or more input time subframes, and wherein an output time frame, to which the second set of parameters is related, is smaller than the input time frame and longer than an input time subframe of the two or more input time subframes, and wherein the converting comprises calculating a raw parameter of the second set of parameters for each one of the two or more input time subframes being time-subsequent and combining at least two raw parameters to derive a parameter of the second set of parameters related to the output time frame, or wherein the converting comprises calculating at least one raw parameter for each output time frame using at least one parameter of the first set of parameters for the input time frame, calculating a smoothing factor for each raw parameter in accordance with a smoothing rule, and applying a corresponding smoothing factor to a corresponding raw parameter to derive the parameter of the second set of parameters for the output time frame, wherein the first set of parameters comprises a diffuseness parameter for an input frequency band, and wherein the second set of parameters comprises a residual prediction gain parameter for an output frequency band, and wherein the converting comprises using, as the residual prediction gain parameter for the output frequency band, the diffuseness parameter from the input frequency band, when the input frequency band and the output frequency band are equal to each other, or deriving, from the diffuseness parameter for the input frequency band, a diffuseness parameter for the output frequency band, and using the diffuseness parameter for the output frequency band as the residual prediction gain parameter for the output frequency band, wherein the generating comprises performing a conversion of a time portion of the transport signal corresponding to an output time frame into a spectral representation, performing an upmixing operation of the spectral representation using the second set of parameters to acquire the two or more channels in the spectral representation; and converting each channel of the two or more channels in the spectral representation into a time representation to acquire a raw time representation of the two or more channels, and wherein the raw time representation of the two or more channels and an enhancement representation of the two or more channels are combined, wherein the generating comprises performing a conversion of a time portion of the transport signal corresponding to an output time frame into a spectral representation, wherein the time portion of the transport signal is shorter than an input time frame, in which the first set of parameters are organized, performing an upmixing operation of the spectral representation using the second set of parameters to acquire the two or more channels in the spectral representation; and converting each channel of the two or more channels in the spectral representation into a time representation, wherein the first set of parameters comprises a direction of arrival parameter for an input frequency band, and wherein the second set of parameters comprises a side gain parameter per input frequency band, and wherein the converting comprises calculating the side gain parameter for an output frequency band using the following equation:

$$\text{sidegain}\ [b] = \sin\left(\text{azimuth}\ [b] * \frac{\pi}{180}\right)\cos\left(\text{elevation}\ [b] * \frac{\pi}{180}\right),$$

wherein b is the output frequency band, wherein sidegain is the side gain parameter, wherein azimuth is an azimuth component of the direction of arrival parameter, and wherein elevation is an elevation component of the direction of arrival parameter, or wherein the generating comprises generating a raw representation of the two or more channels using the second set of parameters and the transport signal, wherein the method further comprises generating an enhancement representation of the two or more channels using the transport signal, and combining the raw representation of the two or more channels and the enhancement representation of the two or more channels to acquire the processed audio scene.

29. A non-transitory digital storage medium having a computer program stored thereon to perform a method of processing an encoded audio scene representing a sound field related to a virtual listener position, the encoded audio scene comprising information on a transport signal and a first set of parameters related to the virtual listener position, the method comprising:

converting the first set of parameters into a second set of parameters related to a channel representation comprising two or more channels for a reproduction at predefined spatial positions for the two or more channels; and generating a processed audio scene using the second set of parameters and the information on the transport signal, wherein an input time frame, to which the first set of parameters is related, comprises two or more input time subframes, and wherein an output time frame, to which the second set of parameters is related, is smaller than the input time frame and longer than an input time subframe of the two or more input time subframes, and wherein the converting comprises calculating a raw parameter of the second set of parameters for each one of the two or more input time subframes being time-subsequent and combining at least two raw parameters to derive a parameter of the second set of parameters related to the output time frame, or wherein the converting comprises calculating at least one raw parameter for each output time frame using at least one parameter of the first set of parameters for the input time frame, calculating a smoothing factor for each raw parameter in accordance with a smoothing rule, and applying a corresponding smoothing factor to a corresponding raw parameter to derive the parameter of the second set of parameters for the output time frame, or wherein the first set of parameters comprises a diffuseness parameter for an input frequency band, and wherein the second set of parameters comprises a residual prediction gain parameter for an output frequency band, and wherein the converting comprises using, as the residual prediction gain parameter for the output frequency band, the diffuseness parameter from the input frequency band, when the input frequency band and the output frequency band are equal to each other, or deriving, from the diffuseness parameter for the input frequency band, a diffuseness parameter for the output frequency band, and using the diffuseness parameter for the output frequency band as the residual prediction gain parameter for the output frequency band, or wherein the generating comprises performing a conversion of a time portion of the transport signal corresponding to an output time frame into a spectral representation, performing an upmixing operation of the spectral representation using the second set of parameters to acquire the two or more channels in the spectral representation; and converting each channel of the two or more channels in the spectral representation into a time representation to acquire a raw time representation of the two or more channels, and wherein the raw time representation of the two or more channels and an enhancement representation of the two or more channels are combined, or wherein the generating comprises performing a conversion of a time portion of the transport signal corresponding to an output time frame into a spectral representation, wherein the time portion of the transport signal is shorter than an input time frame, in which the first set of parameters are organized, performing an upmixing operation of the spectral representation using the second set of parameters to acquire the two or more channels in the spectral representation; and converting each channel of the two or more channels in the spectral representation into a time representation, or wherein the first set of parameters comprises a direction of arrival parameter for an input frequency band, and wherein the second set of parameters comprises a side gain parameter per input frequency band, and wherein the converting comprises calculating the side gain parameter for an output frequency band using the following equation:

$$\text{sidegain } [b] = \sin\left(\text{azimuth } [b] * \frac{\pi}{180}\right)\cos\left(\text{elevation } [b] * \frac{\pi}{180}\right),$$

wherein b is the output frequency band, wherein sidegain is the side gain parameter, wherein azimuth is an azimuth component of the direction of arrival parameter, and wherein elevation is an elevation component of the direction of arrival parameter, or wherein the generating comprises generating a raw representation of the two or more channels using the second set of parameters and the transport signal, wherein the method further comprises generating an enhancement representation of the two or more channels using the transport signal, and combining the raw representation of the two or more channels and the enhancement representation of the two or more channels to acquire the processed audio scene, when said computer program is run by a computer.

* * * * *